US012653213B2

(12) United States Patent
Hibi

(10) Patent No.: US 12,653,213 B2
(45) Date of Patent: Jun. 16, 2026

(54) SOLID PASTE COMPOSITION FOR COOKING AND METHOD FOR PRODUCING SAME

(71) Applicant: MIZKAN HOLDINGS CO., LTD., Aichi (JP)

(72) Inventor: Naruhiro Hibi, Aichi (JP)

(73) Assignee: MIZKAN HOLDINGS CO., LTD., Aichi (JP)

( * ) Notice: Subject to any disclaimer, the term of this patent is extended or adjusted under 35 U.S.C. 154(b) by 667 days.

(21) Appl. No.: 17/734,570

(22) Filed: May 2, 2022

(65) Prior Publication Data

US 2022/0264917 A1 Aug. 25, 2022

Related U.S. Application Data

(63) Continuation of application No. PCT/JP2020/026288, filed on Jul. 3, 2020.

(30) Foreign Application Priority Data

Nov. 1, 2019 (JP) ................................. 2019-200278

(51) Int. Cl.
| | |
|---|---|
| *A23L 7/109* | (2016.01) |
| *A21D 8/02* | (2006.01) |
| *A21D 13/045* | (2017.01) |
| *A23B 2/80* | (2025.01) |
| *A23L 5/10* | (2016.01) |

(52) U.S. Cl.
CPC ................ *A23L 7/109* (2016.08); *A21D 8/02* (2013.01); *A21D 13/045* (2017.01); *A23B 2/80* (2025.01); *A23L 5/13* (2016.08); *A23V 2002/00* (2013.01)

(58) Field of Classification Search
CPC ......... A21D 13/045; A21D 8/02; A23L 11/05; A23L 3/36; A23L 5/10; A23L 5/13; A23L 5/30; A23L 7/109; A23V 2002/00

USPC .......................................................... 426/285
See application file for complete search history.

(56) References Cited

U.S. PATENT DOCUMENTS 5,989,620 A 11/1999 Wang et al.

FOREIGN PATENT DOCUMENTS

JP 2016077196 A 5/2016

OTHER PUBLICATIONS

Chaabani et al. https://doi.org/10.1016/j.aquaeng.2022.102268 (Agricultural Engineering vol. 98, Aug. 2022, 102268). (Year: 2022).*
N. Wang et al., "Pasta-Like Product from Pea Flour by Twin-Screw Extrusion," Journal of Food Science, vol. 64, No. 4, pp. 671-678, 1999 (8 pages).
International Search Report issued in corresponding Japanese Application No. PCT/JP2020/026288; mailed Oct. 6, 2020 (2 pages).
Written Opinon of the International Searching Authority issued in corresponding Japanese Application No. PCT/JP2020/026288; mailed Oct. 6, 2020 (3 pages).

* cited by examiner

*Primary Examiner* — Subbalakshmi Prakash
(74) *Attorney, Agent, or Firm* — Osha Bergman Watanabe & Burton LLP

(57) ABSTRACT

Provided is a solid paste composition for heat cooking which has excellent softening properties when cooked and has reduced stickiness during heat cooking. This composition contains 19 mass % or more, on a dry mass basis, of starch and 4.0 mass % or more, on a dry mass basis, of a protein. The composition also has a value ($\alpha1$) of a frozen slice X of a frozen product of the composition prepared under a predetermined condition is 16.0 or less. The composition has a value ($\beta1$) of the frozen slice X of the composition prepared under a predetermined condition satisfies the formula $\alpha1 \times \beta1 \leq 7.0$ in relation to the value $\alpha1$.

22 Claims, No Drawings

SOLID PASTE COMPOSITION FOR COOKING AND METHOD FOR PRODUCING SAME

TECHNICAL FIELD

One or more embodiments of the present invention relates to a solid paste composition for heat cooking and a method of producing the composition.

BACKGROUND

There are a wide variety of solid paste compositions for heat cooking all over the world, which are made from various raw materials such as cereal flour and starch, by kneading the material with water and salts into a dough, which is then made into various shapes. They are commonly in elongated shapes (e.g., pasta- and noodle-like foods), but some are there are also made into other shapes such as strips, plates, reeds, tubes, dumplings, grains, etc.

Such solid paste compositions for heat cooking, whether in raw or dried form, are eaten after heat cooking. However, such compositions tend to take a long time for heat cooking until they are softened for eating. While there are some products that have been processed to be easily softened by heat cooking, such compositions tend to stick together during heat cooking and have some difficulty in heat cooking. Therefore, it was known to prepare noodles by mixing dough ingredients containing a noodle line loosening improver with water, as described in Patent Literature 1.

PATENT LITERATURE

[Patent Literature 1]JP2016-077196A

However, the technology described in Patent Document 1 is not desirable because it exhibits the taste of the noodle line loosening improver, which is composed of emulsified fats. This technology does not meet the recent need for additive-free foods. On the other hand, the conventional starch-based compositions for heat cooking become elastic and give a rubbery texture when their surface is hardened to increase their crunchiness.

SUMMARY

Through intensive efforts in view of these circumstances, the inventors focused on specific components in the starch structure inside the composition and adjusted their ratios to thereby arrive at a solid paste composition for heat cooking that has an excellent softening property during heat cooking and a reduced property of sticking together during heat cooking. In addition, the inventors focused on kneading of the dough composition with strong energy under high-temperature and high-pressure conditions, which are not typically employed in the conventional art by those skilled in the art since such conditions may denature gluten contained in wheat, etc., and found that the solid paste composition for heat cooking mentioned above can be produced according to a simple method by processing edible plant-derived raw materials under specific conditions. Based on these findings, the inventors then proceeded with further research, and have completed the following embodiments.

Specifically, aspects of the present disclosure include Aspects [1] to [27] below.

[Aspect 1]

A solid paste composition for heat cooking satisfying the requirements (1) to (4) below.

(1) The composition has a starch content of in terms of dry mass basis 19 mass % or more.

(2) The composition has a protein content of in terms of dry mass basis 4.0 mass % or more.

(3) when the composition is heated in water at 90° C. for 6 minutes and then frozen at −25° C., and the resulting frozen composition is cut along a cut plane X into a composition frozen section X with a thickness of 30 µm, the value [α] of the resulting section measured under [Condition A] below (hereinafter referred to as "α1") is 16.0 or less.

[Condition A] The composition frozen section is subjected to MALDI-TOFMS imaging mass spectrometry using α-cyano-4-hydroxycinnamic acid as a matrix.

[α] The ratio of the signal intensity at m/z=213.38 to the signal intensity at m/z=788.37 from the composition section.

(4) when the composition is heated in water at 90° C. for 6 minutes and then frozen at −25° C., and the resulting frozen composition is cut along a cut plane X into a composition frozen section X with a thickness of 30 µm, the value [β] of the resulting section measured under [Condition B] below (hereinafter referred to as "β1") satisfies the relationship defined in [Formula 1] below with regard to the value α1.

[Condition B] The composition frozen section is subjected to MALDI-TOFMS imaging mass spectrometry using sinapinic acid as a matrix.

[β] The ratio of the signal intensity at m/z=12345.17 to the signal intensity at m/z=5962.70 from the composition section.

$$\alpha 1 \times \beta 1 \le 7.0 \qquad \text{[Formula 1]}$$

[Aspect 2]

The composition according to Aspect 1, wherein the β1 is 1.70 or less.

[Aspect 3]

The composition according to Aspect 1 or 2, wherein the cut plane X in [Condition A] is orthogonal to the longitudinal axis of the composition.

[Aspect 4]

The composition according to any one of Aspects 1 to 3, which further satisfies the requirements (5) and (6) below.

(5) when the composition is heated in water at 90° C. for 6 minutes and then frozen at −25° C., and the resulting frozen composition is cut along a cut plane Y, which is orthogonal to the cut plane X, into a composition frozen section Y with a thickness of 30 µm, the value [α] of the resulting section measured under the [Condition A] above (hereinafter referred to as "α2") is 16.0 or less.

(6) when the composition is heated in water at 90° C. for 6 minutes and then frozen at −25° C., and the resulting frozen composition is cut along a cut plane Y, which is orthogonal to the cut plane X, into a composition frozen section Y with a thickness of 30 µm, the value [β] of the resulting section measured under the [Condition B]

above (hereinafter referred to as "β2") satisfies the relationship defined in [Formula 2] below with regard to the value α2.

$$\alpha2 \times \beta2 \le 7.0 \qquad \text{[Formula 2]}$$

[Aspect 5]

The composition according to Aspect 4, wherein the value β2 is 1.70 or less.

[Aspect 6]

The composition according to any one of Aspects 1 to 5, wherein when a 6% suspension of a crushed product of the composition is observed, the number of starch grain structures observed is $300/mm^2$ or less.

[Aspect 7]

The composition according to any one of Aspects 1 to 6, further comprising ingredients derived from an edible plant.

[Aspect 8]

The composition according to Aspect 7, wherein the edible plant is a dried edible plant with a dry basis moisture content of less than 15 mass %.

[Aspect 9]

The composition according to Aspect 7 or 8, wherein the edible plant is a pulse.

[Aspect 10]

The composition according to Aspect 9, wherein the pulse is one or more species of pulse selected from *Pisum, Phaseolus, Cajanus, Vigna, Vicia, Cicer, Glycine* and Lens species.

[Aspect 11]

The composition according to Aspect 9 or 10, wherein the pulse is in the form of pulse flour with a particle size $d_{90}$ of less than 500 μm after subjected to ultrasonic treatment.

[Aspect 12]

The composition according to any one of Aspects 7 to 11, wherein the ratio of the starch content derived from edible plant to the total starch content in the composition is 10 mass % or more.

[Aspect 13]

The composition according to any one of Aspects 7 to 12, wherein the ratio of the protein content derived from edible plant to the total protein content in the composition is 10 mass % or more.

[Aspect 14]

The composition according to any one of Aspects 1 to 13, which is not a swollen product.

[Aspect 15]

The composition according to any one of Aspects 1 to 14, which has a dry basis moisture content of 60 mass % or less.

[Aspect 16]

A crushed composition prepared by crushing a composition according to any one of Aspects 1 to 15.

[Aspect 17]

A crushed composition agglomerate prepared by agglomerating a crushed composition according to Aspect 16.

[Aspect 18]

A process of producing a solid paste composition for heat cooking according to any one of Aspects 1 to 15, comprising the steps of:

(i) preparing a paste dough composition having a starch content of 10.0 mass % or more in terms of dry mass basis, a protein content of 4 mass % or more in terms of dry mass basis, and a dry basis moisture content of 20 mass % or more; and (ii) kneading the composition prepared in step (i) at a temperature of from 110° C. to 190° C. with an SME of 400 kJ/kg or more under a pressure of 0.1 MPa or more.

[Aspect 19]

The process according to Aspect 18, wherein the kneading in step (ii) is carried out for a period of from 0.1 minute to 60 minutes.

[Aspect 20]

The process according to Aspect 18 or 19, further comprising, after step (ii): (iii) cooling the composition kneaded in step (ii) to a temperature at which the composition does not swell.

[Aspect 21]

The process according to Aspect 20, wherein in step (iii), the composition is maintained for a continuous period of 0.02 hour or more from when the temperature fell below 90° C. until when the dry basis moisture content fell below 25 mass %.

[Aspect 22]

The process according to Aspect 20 or 21, wherein the kneading in step (ii) and/or the cooling in step (iii) are/is carried out using an extruder.

[Aspect 23]

The process according to Aspect 22, wherein the extruder is a biaxial extruder.

[Aspect 24]

The process according to Aspect 22 or 23, wherein the ratio of the length of a flight screw part to the total length of a barrel of the extruder is 95% or less.

[Aspect 25]

The process according to any one of Aspects 20 to 24, further comprising, after step (iii):

(iv) crushing the composition to produce a crushed composition.

[Aspect 26]

The process according to Aspect 25, further comprising, after step (iv):

(v) agglomerating the crushed composition to produce a crushed composition agglomerate.

[Aspect 27]

A solid paste composition for heat cooking produced by a process of according to any one of Aspects 18 to 26.

One or more embodiments of the present invention provides a solid paste composition for heat cooking with an excellent softening property during heat cooking and a suppressed property of sticking together during heat cooking, as well as a method for producing the composition.

DETAILED DESCRIPTION

One or more embodiments of the present invention will now be described based on specific embodiments. These embodiments should not be construed to limit the scope of the present invention. All references, including patent publications, unexamined patent publications, and non-patent publications cited in this specification, can be incorporated by reference in their entirety for all purposes.

[I: Solid Paste Composition for Heat Cooking]

An embodiment of one or more embodiments of the present invention relates to a solid paste composition for heat cooking (hereinafter also referred to as "the solid paste composition of one or more embodiments of the present invention" or "the composition of one or more embodiments of the present invention").

(1) Summary of the Composition

Definitions

The "heat cooking" herein generally refers to a heat cooking method by raising the temperature of food via application of heat to the food, either directly with fire or microwaves or indirectly through a medium such as water or air, and generally means heat cooking at a heating temperature of, e.g., about 80° C. to 99° C., for a time period of, e.g., 1 minute or longer to 60 minutes or shorter. Examples of such heat cooking methods include, although not limited to, baking, boiling, frying, and steaming.

The term "solid" herein refers to a composition's property of retaining its shape even when cooked.

The term "paste composition" herein refers to a food composition produced by kneading food ingredients, preferably a food composition produced by kneading food ingredients derived from edible plants, and more preferably a food composition produced by kneading edible plants.

Embodiments of the Composition

Since the composition of one or more embodiments of the present invention has the property of keeping its ingredients from eluting out in water as will be explained below, it may preferably be subjected to heat cooking in liquid (especially in water), which is a heat cooking environment where such elution of ingredients tends to occur. The solid paste composition for heat cooking of one or more embodiments of the present invention may preferably be a composition in the form of, e.g., noodles or noodle-like strings or strips such as pasta, since the solid paste composition of one or more embodiments of the present invention has the property of retaining its edible shape even after heat cooked in water for eating (e.g., more than 5 minutes in water at a temperature of 90° C. or higher).

Examples of the composition of one or more embodiments of the present invention include, although not limited to: pasta, Chinese noodles, udon (Japanese wheat-flour noodles), inaniwa udon, kishimen, houtou, suiton, hiyamugi, somen (variations of udon), soba (Japanese buckwheat-flour noodles), soba gaki (Japanese buckwheat-flour paste), beehun (rice vermicelli), pho, reimen (Korean cold noodles), vermicelli, oatmeal, couscous, kiritanpo (variation of Japanese rice cake in an elongate shape), tteok, and gyoza skins.

Examples of pastas include long pasta and short pasta.

The term "long pasta" is typically a generic term referring to long, thin pasta, but may also be used herein in a broader meaning encompassing udon and soba noodles. Specific examples include, although not limited to, spaghetti (diameter: 1.6 mm to 1.7 mm), spaghettini (diameter: 1.4 mm to 1.5 mm), vermicelli (diameter: 2.0 mm to 2.2 mm), cappellini (diameter: 0.8 mm to 1.0 mm), linguini (short diameter: about 1 mm, long diameter: about 3 mm), tagliatelle or fettuccine (short diameter: about 1 mm, long diameter: about 3 mm), and other types of pasta. diameter: about 1 mm, long diameter: about 3 mm), tagliatelle or fettuccine (flat noodles of about 7 mm to 8 mm in width), pappardelle (flat noodles of about 10 mm to 30 mm in width), etc. Long pasta is a product that typically has a large contact area between noodles and therefore tends to lose its surface smoothness and adhere to each other. Accordingly, making the composition of one or more embodiments of the present invention into the form of pasta may be useful and desirable.

The term "short pasta" is typically a general term referring to short pasta, but may also be used herein in a broader meaning encompassing product once shaped in long pasta and then processed into smaller sizes, such as fregola (granular pasta) and couscous. Examples include, although not limited to, macaroni (cylindrical shape with a diameter of about 3 to 5 mm), penne (cylindrical shape with both ends cut diagonally like the tip of a pen), farfalle (shaped like a butterfly), conchiglie (shaped like a seashell), and orecchiette (dome-shaped like an ear), etc.

*Composition in Dry State:

Conventional solid paste compositions for heat cooking, especially those in a dry state, are prone to sticking together during heat cooking due to the heat load during drying. In contrast, one or more embodiments of the present invention serves to reduce the tendency of the composition to bind during heat cooking. Therefore, one or more embodiments of the present invention is particularly useful when applied to a solid paste composition for heat cooking in a dry state.

The "dry" state herein refers to a state in which the moisture content is less than 25 mass % on a dry weight basis and the water activity value is less than 0.85. The composition of one or more embodiments of the present invention in such a dry state may preferably have a moisture content of less than 20 mass %, or even less than 15 mass % on a dry weight basis, and a water activity value of 0.80 or less, and even 0.75 or less. The water content in a solid paste composition can be measured by subjecting the dried powder to the decompression heating and drying method described below, and the water activity value can be measured by using a general water activity measurement device (e.g., "LabMaster-aw NEO," manufactured by Novavacina, which includes an electrical resistance (electrolyte) humidity sensor) according to a standard method.

The term "composition softening property upon heat cooking" herein refers to the degree to which the composition has the property of easily swelling upon heat cooking and has the quality of quickly softening and being easily cooked.

The term "composition adhesion during heat cooking" herein refers to the degree to which pieces of a composition stick to each other during heat cooking.

*Composition Made into Elongated Form:

Some conventional starch-based solid paste compositions for heat cooking in the form of long and thin pasta-like forms tend to have certain issues. Namely, if their softening property is low during heat cooking, they require a longer time to cook, while if the softening property is improved during heat cooking, they tend to bind during heat cooking, making it difficult to cook. In contrast, the composition according to one or more embodiments of the present invention has easy-to-cook physical properties that suppress the adhesion of the composition during heat cooking while increasing the softening property of the composition during heat cooking and reducing the heat cooking time. Therefore, the compositions according to one or more embodiments of the present invention are particularly useful when applied to compositions in the form of long and thin pieces.

The composition of one or more embodiments of the present invention made into such an elongated form may preferably have a diameter of, although not limited to, typically 20 mm or smaller, preferably 10 mm or smaller, more preferably 5 mm or smaller, even more preferably 3 mm or smaller, even further preferably 2 mm or smaller. The "diameter" of a solid paste composition herein refers to the length of the longest diagonal line of a cut surface of the solid paste composition when cut perpendicular to its longitudinal direction (the maximum length of line segments connecting any two points on the contour of the cross-section), and means its diameter if the cut surface is circular, its major axis if the cut surface is oval, or its diagonal if the cut surface is rectangular (e.g., in the case of a composition formed into a plate).

(2) Constituents of the Composition

*Starch:

The composition according to one or more embodiments of the present invention contains starch in an amount of a predetermined value or more.

Specifically, the lower limit for the starch content in the composition according to one or more embodiments of the present invention may typically be 19 mass % or more, preferably 20 mass % or more, more preferably 25 mass % or more, still more preferably 30 mass % or more, even more preferably 35 mass % or more, especially preferably 40 mass % or more, still more preferably 45 mass % or more. On the other hand, the upper limit of the starch content in the composition of one or more embodiments of the present invention is not particularly limited, but may be, in terms of dry mass basis, 85 mass % or less, particularly 80 mass % or less, or 70 mass % or less, or 60 mass % or less.

The origin of the starch in the composition of one or more embodiments of the present invention is not particularly limited. Examples include plant-derived starch and animal-derived starch, of which starch of plant origin is preferred. Specifically, the ratio of the plant-derived starch content to the total starch content in the composition may typically be 10 mass % or more, particularly 30 mass % or more, more particularly 50 mass % or more, still particularly 70 mass % or more, or 90 mass % or more, especially 100 mass %. Examples of plant-derived starches include those derived from cereals, pulse, potatoes, vegetables, seeds, and fruits. From the viewpoint of texture of the composition, those derived from cereals and pulse are more preferred, those derived from pulse are even more preferred, especially those derived from peas, and those derived from yellow peas are most preferred. The same comments apply to the starch content in the dough composition, which will be discussed later.

The starch incorporated in the composition of one or more embodiments of the present invention may be in the form of an isolated pure product or, preferably, may be present in the state of being contained in edible plant. Specifically, the ratio of the content of starch contained in edible plant to the total starch content of the composition may preferably be 10 mass % or more, particularly 20 mass % or more, more particularly 30 mass % or more, especially 40 mass % or more, or 50 mass % or more, or 60 mass % or more, especially 70 mass % or more, or 80 mass % or more, or 90 mass % or more, still more preferably 100 mass %. The same comments apply to the starch content in the dough composition, which will be discussed later.

The starch content in a solid paste composition herein can be measured by the method such as AOAC 996.11 in the Japan Standard Tables for Food Composition 2015 (7th revised edition), which involves extraction treatment with 80% ethanol for removing soluble carbohydrates (glucose, maltose, maltodextrin, etc.) that may affect the measured values.

*Protein:

The composition according to one or more embodiments of the present invention contains protein in an amount of a predetermined value or more. The composition of one or more embodiments of the present invention having a protein content of a predetermined value or more is especially preferred since it serves to adjust the percentage of low molecular components that inhibit swelling of the starch structure during heat cooking to within a certain range, as described below.

Specifically, the lower limit of the protein content in the composition according to one or more embodiments of the present invention in terms of dry mass basis is typically 4.0 mass % or more, preferably 5.0 mass % or more, more preferably 6.0 mass % or more, especially preferably 7.0 mass % or more, or 8.0 mass % or more, or 9.0 mass % or more, or 10.0 mass % or more, or 11.0 mass % or more, or 12.0 mass % or more, or 13.0 mass % or more, or 14.0 mass % or more, or 15.0 mass % or more, or 16.0 mass or more, or 17.0 mass % or more, or 18.0 mass % or more, or 19.0 mass % or more, or 20.0 mass % or more, still more preferably 21.0 mass % or more. On the other hand, the upper limit of the protein content in the composition according to one or more embodiments of the present invention is not particularly limited, but may be, in terms of dry mass basis, typically 85 mass % or less, preferably 80 mass % or less, more preferably 75 mass % or less, more preferably 70 mass % or less, more preferably 65 mass % or less, more preferably 60 mass % or less.

The origin of the protein in the composition of one or more embodiments of the present invention is not particularly limited. Examples include plant-derived protein and animal-derived protein, of which protein of plant origin is preferred. Specifically, the ratio of the plant-derived protein content to the total protein content in the composition may typically be typically 10 mass % or more, particularly 20 mass % or more, more particularly 30 mass % or more, especially 40 mass % or more, or 50 mass % or more, or 60 mass % or more, especially 70 mass % or more, or 80 mass % or more, or 90 mass % or more, still more preferably 100 mass %. Examples of plant-derived proteins include those derived from cereals, pulse, potatoes, vegetables, seeds, and fruits. From the viewpoint of exhibiting certain character-istics when analyzed by MALDI-TOFMS imaging mass spectrometry, those derived from cereals and pulse are more preferred, those derived from pulse are even more preferred, especially those derived from peas, and those derived from yellow peas are most preferred. The same comments apply to the protein content in the dough composition, which will be discussed later.

The protein incorporated in the composition of one or more embodiments of the present invention may be in the form of an isolated pure product or, preferably, may be present in the state of being contained in edible plant. Specifically, the ratio of the content of protein contained in edible plant to the total protein content of the composition may preferably be 10 mass % or more, particularly 20 mass % or more, more particularly 30 mass % or more, especially 40 mass % or more, or 50 mass % or more, especially 70 mass % or more, or 90 mass % or more, still more preferably 100 mass %. The same comments apply to the protein content in the dough composition, which will be discussed later.

Typically 10 mass % or more, particularly 30 mass % or more, more particularly 50 mass % or more, especially 70 mass % or more, or 90 mass % or more, still more preferably 100 mass %, of each of the protein and the starch contained in the composition of one or more embodiments of the present invention may preferably be derived from pulse, more preferably from the same species of pulse, still more preferably from the same individual of pulse. Likewise, typically 10 mass % or more, particularly 20 mass % or more, more particularly 30 mass % or more, especially 40 mass % or more, or 50 mass % or more, or 60 mass % or more, especially 70 mass % or more, or 80 mass % or more, or 90 mass % or more, still more preferably 100 mass %, of each of the protein and the starch contained in the composition of one or more embodiments of the present invention may preferably be present in the composition in the form of being contained in edible plant. The same comments apply to the starch and protein contents in the dough composition, which will be discussed later.

The protein content in a solid paste composition herein can be measured by a method, e.g., according to the Japan Standard Tables for Food Composition 2015 (7th revised edition)," which involves multiplying the amount of nitrogen quantified by the modified Kjeldahl method by the "nitrogen-protein conversion factor."

*Total Oil and Fat Content:

The total oil and fat content in the composition of one or more embodiments of the present invention is not particularly limited, but may preferably be, in terms of dry mass basis, typically less than 17 mass %, particularly less than 15 mass %, more particularly less than 13 mass %, still particularly less than 10 mass %, or less than 8 mass %, or less than 7 mass %, or less than 6 mass %, or less than 5 mass %, or less than 4 mass %, or less than 3 mass %, or less than 2 mass %, or less than 1 mass %, especially less than 0.8 mass %. On the other hand, the lower limit of the total oil and fat content is not particularly limited, but may preferably be, in terms of dry mass basis, typically 0.01 mass % or more. The total oil and fat content in a solid paste composition can be measured by a method, e.g., according to the Japan Standard Tables for Food Composition 2015 (7th revised edition), using the Soxhlet extraction method with diethyl ether.

*Dry Mass Basis Moisture Content:

Some conventional solid paste compositions for heat cooking having low dry basis moisture contents are prone to sticking together during heat cooking due to heat load during drying. Therefore, one or more embodiments of the present invention is particularly useful when applied to compositions having dry basis moisture contents of a predetermined value or less.

Specifically, the dry mass basis moisture content in the composition of one or more embodiments of the present invention is not particularly limited, but may be 60 mass % or less, particularly 50 mass % or less, or 40 mass % or less, or 30 mass % or less, or 20 mass % or less, or 15 mass % or less. On the other hand, the lower limit of the dry mass basis moisture content in the composition of one or more embodiments of the present invention is not limited, but from the viewpoint of industrial production efficiency, it may be 0.5 mass % or more, or 1 mass % or more, or 2 mass % or more. The dry mass basis moisture content in the composition of one or more embodiments of the present invention may either be derived from the ingredients of the composition and/or result from water added externally.

The "dry basis moisture content" herein refers to the ratio of the total amount of moisture in the composition of one or more embodiments of the present invention which either originates from the raw materials or was added externally to the total amount of solids in the solid paste composition of one or more embodiments of the present invention. The value can be measured by a method, for example, according to the Japan Standard Tables for Food Composition 2015 (7th revised edition), by heating to 90° C. using the decompression heating and drying method. Specifically, an appropriate amount of sample is put in a pre-weighed weighing vessel ($W_0$) and adjusted to 0.1 mg ($W_1$), the weighing vessel with the lid removed or opened is placed in a reduced pressure electric constant temperature dryer adjusted to a predetermined temperature (more specifically, 90° C.) at normal pressure, the door is closed, and the vacuum pump is operated to dry the sample at a predetermined reduced pressure for a predetermined period of time. The vacuum pump is then stopped, dry air is sent to bring the pressure back to normal, the weighing vessel is removed, the lid is put on, the vessel is left to cool in a desiccator, and the mass is then weighed. The process of drying, cooling, and weighing is repeated until a constant amount ($W_2$, 0.1 mg) is reached, and the dry basis moisture content (mass %) is determined using the following formula.

$$\text{Dry basis moisture content } (g/100\ g) = \qquad \text{[Formula 1]}$$

$$(W_1 - W_2)/(W_2 - W_0) \times 100$$

(In the formula, $W_0$ represents the mass of the empty weighing vessel as the constant mass (g), $W_1$ represents the mass of the weighing vessel accommodating the sample before drying (g), and $W_2$ represents the mass of the weighing vessel accommodating the sample after drying (g).)

*Pulse:

When pulse is used as edible plant in the composition of one or more embodiments of the present invention, preferable examples of pulse species include one or more species selected from *Pisum, Glycine, Phaseolus, Cajanus, Vigna, Vicia, Cicer, Lens, Lupinus, Lathyrus, Cyamopsis, Mucuna, Ceratonia*, and *Parkia* species. Specific examples of pulse species include, although not limited to: peas (in particular, yellow peas, white peas, and green peas, which are immature seeds), kidney beans, red kidney beans, white kidney beans, black beans, pinto beans, toramame (a variation of kidney beans: concord paul), lima beans, scarlet runner beans, pigeon peas, mung beans, cowpeas, azuki beans, broad beans (*Vicia faba*), soybeans (especially edamame, which are immature seeds of soybeans harvested with their pods in their immature state and characterized by the green appearance of the beans), chickpeas, lentils, blue peas, scarlet runner beans, peanuts, lupin beans, glass peas, locust beans (carob), twisted cluster beans, African locust beans, coffee beans, cacao beans, and Mexican jumping beans. The pulse according to one or more embodiments of the present invention may be prepared either with or without its seed skin. The seed skin herein does not refer to the pod containing beans, but refers to skin covering each bean, which is a membranous structure covering the surface layer of the bean grain itself. The seed skin of beans can be separated from the beans by a common dehulling machine or other means. When the seed skin of beans is used, it can be prepared either by using beans having seed skin or by using the seed skin once separated from the beans.

*Particle Size of Pulse Flour:

When powdered pulse is used as an edible plant in the composition according to one or more embodiments of the present invention, the particle size $d_{90}$ of the pulse flour after subjected to ultrasonic treatment may preferably be less than 500 μm, or less than 450 μm, more preferably less than 400 μm, still more preferably less than 300 μm. The term "particle size $d_{90}$" herein refers to, when the particle size distribution of the object is measured on a volume basis and divided into two parts at a certain particle size, the particle size at which the ratio between the cumulative value of the particle frequency % on the larger side to that on the smaller side are 10:90. The "ultrasonic treatment" herein refers to a treatment with ultrasonic waves of 40 kHz frequency at an output of 40 W for 3 minutes, unless otherwise specified. The specific conditions for measuring particle diameters $d_{90}$ after ultrasonic treatment shall be determined, for example, as described below.

*Other Food Ingredients:

The composition of one or more embodiments of the present invention may further contain any one or more food ingredients. Examples of such food ingredients include vegetable ingredients (vegetables, potatoes, mushrooms, fruits, algae, grains, seeds, etc.), animal ingredients (seafood, meat, eggs, milk, etc.), and microbial food products. The amount of these food ingredients can be set appropriately as long as they do not undermine the purpose of one or more embodiments of the present invention.

*Seasonings and Food Additives:

The composition of one or more embodiments of the present invention may contain any one or more seasonings, food additives, etc. Examples of seasonings and food additives include: soy sauce, miso (Japanese fermented soybean paste), alcohols, sugars (e.g., glucose, sucrose, fructose, glucose-fructose liquid sugar, glucose-fructose liquid sugar, etc.), sugar alcohols (e.g., xylitol, erythritol, maltitol, etc.), artificial sweeteners (e.g., sucralose, aspartame, saccharin, acesulfame K, etc.), minerals (e.g., calcium, potassium, sodium, iron, zinc, magnesium, etc., and their salts), flavoring agents, pH adjusters (e.g., sodium hydroxide, potassium hydroxide, lactic acid, citric acid, tartaric acid, malic acid and acetic acid), cyclodextrins, antioxidants (e.g., vitamin E, vitamin C, tea extract, green coffee bean extract, chlorogenic acid, spice extract, caffeic acid, rosemary extract, vitamin C palmitate, rutin, quercetin, peach extract, sesame extract, etc.), emulsifiers (e.g., glycerin fatty acid esters, acetic acid monoglycerides, lactic acid monoglycerides, citric acid monoglycerides, diacetyl tartaric acid monoglycerides, succinic acid monoglycerides, polyglycerin fatty acid esters, polyglycerin condensed linosylate esters, chiraya extracts, soybean saponins, chia seed saponins, sucrose fatty acid esters, lecithin, etc.), colorants, thickening stabilizers, etc.

However, in view of the recent increase in nature consciousness, the composition of one or more embodiments of the present invention may preferably not contain any additives of any one category, more preferably any two categories, most preferably all three categories, of the so-called emulsifiers, colorants, and thickening stabilizer (e.g., those listed in the "Table of food additive substance names for labeling" section of the "Pocket Book of Food Additives Labeling (2011 edition)" as "colorants," "thickening stabilizers" (especially "modified starches"), and "emulsifiers")

In particular, the composition of one or more embodiments of the present invention may preferably not contain a gelling agent, since the composition can be given elasticity without any gelling agent while being prevented from having excessive elasticity. The composition of one or more embodiments of the present invention may preferably not contain an emulsifier, from the viewpoint of making the natural tastes of the ingredients easily perceptible. In addition, the composition of one or more embodiments of the present invention may preferably not contain any food additives (e.g., e.g., those listed in the "Table of food additive substance names for labeling" section of the "Pocket Book of Food Additives Labeling (2011 edition) used for food additive applications). From the perspective of making it easier to perceive the sweetness of the food itself, the composition of one or more embodiments of the present invention may preferably not contain added sugars (especially purified sugars such as glucose, sucrose, fructose, glucose fructose liquid sugar, fructose dextrose liquid sugar, etc.).

Conventional solid paste compositions for heat cooking (especially those containing gluten having network structure) were provided with elasticity via addition of sodium chloride, which was problematic in terms of affecting the taste and excessive salt intake. This problem is especially pronounced in dry compositions (dried udon, dried hiyamugi, etc.), where sodium chloride is usually used at a level of 3% by mass or higher to maintain compositional elasticity. On the other hand, the composition of one or more embodiments of the present invention is advantageous since even if little or no amount of sodium chloride is added, it can maintain a good quality without losing its elasticity. It is also desirable to apply one or more embodiments of the present invention to solid paste compositions for heat cooking such as pasta, udon, bread, etc., which are usually provided with adhesion and elasticity via addition of gluten and sodium chloride, since they can be made into compositions of good quality without the addition of sodium chloride. Specifically, the sodium chloride content in the composition of one or more embodiments of the present invention on a dry mass basis may typically be 3% by mass or lower, preferably 2% by mass or lower, more preferably 1% by mass or lower, even more preferably 0.7% by mass or lower, particularly preferably 0.5% by mass or lower. The lower limit of the sodium chloride content in the composition of one or more embodiments of the present invention is not particularly limited, and may be 0% by mass. The sodium chloride content in a solid paste composition is calculated by a method, e.g., in accordance with the "Salt equivalent" section of the Japan Standard Tables for Food Composition 2015 (7th revised edition), by measuring the amount of salt using the atomic absorption method and multiplying the measured value by 2.54.

(3) Features Based on MALDI-TOFMS Imaging Mass Spectrometry of Frozen Sections of the Composition after Treatment in Heated Water.

The compositions of one or more embodiments of the present invention may be characterized by the features described below when made into frozen sections under specific conditions and analyzed by imaging mass spectrometry using MALDI-TOFMS.

*Preparation of Frozen Sections after Treated in Heated Water:

In order to measure these properties of a composition, the composition is heated in water at 90° C. for 6 minutes, then frozen at −25° C., and cut into a section with a thickness of 30 μm along a specific cut plane, and the frozen section is then analyzed by MALDI-TOFMS imaging mass spectrometry.

Specifically, preparation of a frozen section of a composition and analysis thereof by MALDI-TOFMS imaging mass spectrometry is not limited, but may preferably be carried out in accordance with the following procedure. The composition is placed in a 1000-fold volume of water heated to 90° C. or higher (more specifically, in water at 90° C.) for 6 minutes, and then frozen at −25° C. and cut into a section with a thickness of 30 μm according to Kawamoto method described in "Use of a new adhesive film for the preparation of multi-purpose fresh-frozen sections from hard tissues, whole-animals, insects and plants", Arch. Histol. Cytol., (2003), 66[2]:123-43. The thus-obtained frozen section of the composition is then subjected to analysis by MALDI-TOFMS imaging mass spectrometry.

*Analysis of Frozen Sections by MALDI-TOFMS Imaging Mass Spectrometry:

The composition frozen sections prepared by the procedure mentioned above are then analyzed by imaging mass spectrometry using the following method.

A rapiflex (Bruker) is used as the MALDI TOFMS analyzer for imaging mass spectrometry, and a GT-X830 scanner (EPSON) is used for image scanning at 6400 dpi. An analysis software flexControl (Bruker) is used, the measurement conditions are set as follows. Laser frequency: 10 kHz; Laser Power: 100; Number of Shots: 500; Sensitivity Gain: 26×(2905V); Scan Range: X=5 μm, Y=5 m; Resulting Field Size: X=9 μm, Y=9 μm; and the imaging area is set so as to surround the entire composition cross section. A matrix suitable for the object to be measured is used as the matrix for analysis, and sprayed using TM-Sprayer (HTX Technologies, LLC) under spray conditions of 70° C. and 10 sprays.

For the measurement of the value [α](the ratio of the signal intensity at m/z=213.38 ([213.38]) to the signal intensity at m/z=788.37 ([788.37]) on the cross section of the composition; also referred to as [213.38]/[788.37]), the matrix for analyzing low molecular substances, i.e., α-cyano-4-hydroxycinnamic acid, is dissolved into a 70% acetonitrile solution containing 0.1% TFA, and 1 mL of the resulting solution is sprayed onto a glass slide, and then dried under reduce pressure in a desiccator for 10 minutes before use.

For the measurement of the value [β] (the ratio of the signal intensity at m/z=12345.17 ([12345.17]) to the signal intensity at m/z=5962.70 ([5962.70]) on the cross section of the composition; also referred to as [12345.17]/[5962.70]), the matrix for analyzing macromolecular substances, i.e., sinapinic acid, is sprayed via a two-step atomization according to Bruker's protocol. Specifically, 2 mL of a solution of sinapinic acid dissolved in ethanol (10 mg/mL) is sprayed onto a frozen section placed on an IOT glass slide, and then dried in a decompression desiccator for 10 minutes. Subsequently, 2 mL of a solution of sinapinic acid dissolved in 30% acetonitrile (60 mg/mL) is sprayed onto the frozen section, and then dried in a decompression desiccator for 10 minutes before use.

Signal intensity analysis is performed using Fleximage. Specifically, the signal intensity of m/z z 0.1 for each target substance is displayed in terms of the shading of white in the image, and the signal intensity of each target substance is determined by measuring the intensity of the white color in the cross-sectional image of the composition (thus, a background with no signal is displayed in black). More specifically, imageJ is used as the image analysis software, and the signal intensity is measured by specifying the measurement points so as to surround the entire cross-sectional image of the composition. In other words, the signal intensity herein refers to the total signal intensity in the range of m/z center value ±0.1 for each target substance.

*Feature (a): The Value [α]([213.38]/[788.37]D signal Intensity Ratio)

One of the features of the composition according to one or more embodiments of the present invention resides in that when the composition is made into a frozen section according to the procedure mentioned above and then analyzed by MALDI-TOFMS imaging mass spectrometry, the ratio ([213.38]/[788.37]) of the signal intensity at m/z=213.38 (also referred to as [213.38]) to the signal intensity at m/z=788.37 (also as [788.37]. Likewise, the signal intensity of the m/z of any number (e.g., N) may also be referred to as [N].) on the cross section of the composition, i.e., the value [α], is equal to or less than a predetermined value (Feature (a)). The composition of one or more embodiments of the present invention satisfying this feature is desirable because this feature serves to impart to the composition the property of swelling easily during heat cooking, resulting in a quality product that softens quickly and is easy to heat cook, which in turn results in a composition with excellent quality at the time of eating with reduced leakage of ingredients due to heat cooking. Although the underlying mechanism is unknown, it is presumably because the proportion of low molecular components that inhibit swelling of the starch structure decreases during heat cooking, resulting in rapid swelling, which in turn leads to a composition with excellent taste at the time of eating with reduced ingredient leakage due to heat cooking.

The value [α] herein represents the ratio of the signal intensity at m/z=213.38 to the signal intensity at m/z=788.37 on the composition section ([213.38]/[788.37]). The values [α] measured under different conditions may be referred to as α1, α2, . . . , etc., respectively.

Specifically, when the composition according to one or more embodiments of the present invention is made into a frozen section according to the procedure mentioned above and then analyzed by MALDI-TOFMS imaging mass spectrometry under Condition A explained below, then the resulting value [α] may typically be16.0 or less, preferably 13.0 or less, more preferably 1310.0 or less, especially 8.0 or less, or 7.0 or less, or 6.0 or less, or 5.0 or less, or 4.0 or less, or 3.0 or less, still more preferably 2.5 or less. On the other hand, the lower limit of this ratio is not particularly limited, but may preferably be 0.01 or more from the viewpoint of industrial productivity.

*Feature (b): The Product of the Value [β ](Signal Intensity Ratio [12345.17]/[5962.70]) Multiplied by the Value [α]

Another feature of the composition according to one or more embodiments of the present invention resides in that when the composition is made into a frozen section according to the procedure mentioned above and then analyzed by MALDI-TOFMS imaging mass spectrometry, the product ([α]×[β]) of the value [β], which is the ratio ([12345.17]/[5962.70]) of the signal intensity at m/z=12345.17 ([12345.17]) to the signal intensity at m/z=5962.70 ([5962.70]), multiplied by the value [α] mentioned above on the cross section of the composition is equal to or less than a predetermined value (Feature (b)).

The value [β] herein represents the ratio of the signal intensity at m/z=12345.17 to the signal intensity at m/z=5962.70 on the composition section [12345.17]/[5962.70]). The values [β] measured under different conditions may be referred to as β1, β2, . . . , etc., respectively.

Specifically, when the composition according to one or more embodiments of the present invention is made into a frozen section according to the procedure mentioned above and then analyzed by MALDI-TOFMS imaging mass spectrometry under Condition B below, the product ([α]×[β]) of the resulting value [β] multiplied by the value [α] mentioned above may preferably be 7.0 or less. The composition of one or more embodiments of the present invention satisfying this feature is desirable because this feature serves to prevent the composition from sticking together during heat cooking, resulting in a quality that is even easier to heat and cook, which in turn allows the individual compositions to cook evenly during heat cooking, resulting in a composition with excellent taste when consumed. The upper limit of this value may preferably be 6.0 or less, more particularly 5.0 or less, especially 4.0 or less, or 3.0 or less, or 2.0 or less, or 1.5 or less, still more preferably 1.0 or less. On the other hand, the lower limit of this value is not particularly limited, but from the viewpoint of industrial productivity, it may preferably be typically 0.01 or more.

*Feature (c): The Value [β]

Another preferable feature of the composition according to one or more embodiments of the present invention resides in that the value [β] mentioned above may preferably be equal to or less than a predetermined value (Feature (c)). Specifically, when the composition according to one or more embodiments of the present invention is made into a frozen section according to the procedure mentioned above and then analyzed by MALDI-TOFMS imaging mass spectrometry under Condition B below, the resulting value [β] may preferably be 1.70 or less. The composition of one or more embodiments of the present invention satisfying this feature may be preferable because this feature may serve to more effectively prevent the composition from sticking together during heat cooking, resulting in a quality that is even easier to heat and cook, which in turn allows the individual compositions to cook evenly during heat cooking, resulting in a composition with excellent taste when consumed. The principle behind this is unknown, but presumably because of a decrease in the percentage of macromolecular components that impart viscosity to the starch structure during heat cooking. This value may more preferably be 1.60 or less, more particularly 1.50 or less, especially 1.40 or less, or 1.30 or less, or 1.20 or less, or 1.10 or less, or 1.00 or less, or 0.90 or less, or 0.80 or less, or 0.70 or less, still more preferably 0.60 or less. On the other hand, the lower limit of this value is not particularly limited, but from the viewpoint of industrial productivity, it may preferably be typically 0.01 or more.

*Cut Plane of Frozen Sections:

The composition according to one or more embodiments of the present invention may be characterized in that when the composition is made into a frozen section according to the procedure mentioned above and then analyzed by MALDI-TOFMS imaging mass spectrometry, it satisfies Features (a) and (b) mentioned above, and also preferably Feature (c) mentioned above. In this regard, the composition of one or more embodiments of the present invention may satisfy Features (a) and (b) above (and preferably Feature (c) above) at least for a frozen section obtained by cutting the frozen composition along any cut plane.

However, the composition of one or more embodiments of the present invention may preferably satisfy Features (a) and (b) above (and preferably Feature (c) above) at least for a frozen section obtained by cutting the frozen composition along a cut plane orthogonal to the longitudinal axis of the composition. The "longitudinal axis" of a composition herein refers to a longitudinal direction of a hypothetical rectangle with a minimum volume inscribed in the composition, while the "transverse axis" of a composition herein refers to a line perpendicular to the longitudinal axis. For example, in the case of compositions manufactured via extrusion, e.g., using an extruder, the extruded direction of the composition corresponds to the longitudinal axis.

The composition of one or more embodiments of the present invention may more preferably be characterized in that when the parameters related to the smooth tissue part are measured according to the procedure mentioned above for both a frozen section X, which is obtained by cutting the frozen composition along an arbitrary cut plane X, and a frozen section Y, which is obtained by cutting the frozen composition along a cut plane Y orthogonal to the cut plane X, the averages of the parameters ($\alpha 1$, $\beta 1$) obtained for the frozen section X and the parameters ($\alpha 2$, $\beta 2$) obtained for the frozen section Y satisfy Features (a) and (b) above (and preferably Feature (c) above). The composition of one or more embodiments of the present invention may still more preferably be characterized in that both the parameters ($\alpha 1$, $\beta 1$) obtained for the frozen section X and the parameters ($\alpha 2$, $\beta 2$) obtained for the frozen section Y satisfy Features (a) and (b) above (and preferably Feature (c) above). In this case, the cut plane X may preferably be a plane orthogonal to the longitudinal axis of the composition, while the cut plane Y may preferably be a plane parallel to the longitudinal axis of the composition.

If the distribution of signal intensity of a composition is uniform, the signal intensity of the entire composition can be estimated by observing the signal intensity of an arbitrary section as a representative site. However, if the distribution of signal intensity is uneven, the signal intensity on multiple cut surfaces can be observed, and the results of these observations can be added together to obtain a measurement of the signal intensity of the entire composition.

(4) Other Properties of the Composition:

*Starch Grain Structures:

The composition according to one or more embodiments of the present invention may more preferably be characterized in that the number of starch grain structures observed under certain conditions is equal to or less than a predetermined value, because this feature may indicate that the starch in the composition takes on a continuous structure with the starch leached from the inside of the starch grains.

The starch grain structure herein refers to an iodine-stained structure that has a circular shape with a diameter of 1 to 50 μm on a flat image, and can be observed under a magnified field of view of, e.g., a 6% water suspension of a crushed product of the composition in water. Specifically, a 6% suspension of the composition powder is prepared by screening the pulverized product of the composition through a sieve with a mesh opening of 150 μm, and suspending 3 mg of the composition powder which has passed through the 150-μm sieve in 50 μL of water. A sample is prepared by placing this suspension on a slide, and observed either using a phase contrast microscope under polarized light or under an optical microscope with iodine-staining the sample. The magnification ratio is not limited, but may be, for example, 100× or 200×. If the starch grain structure is uniformly distributed in the prepared sample, the percentage of starch grain structure in the entire sample can be estimated by observing a representative field of view of the sample. On the other hand, if the distribution of the starch grain structure in the sample is uneven, a plurality of fields of view in the sample may be observed, and the results of the observations may be added together as the measurement for the entire sample.

Specifically, the number of starch grain structures of the composition according to one or more embodiments of the present invention observed under the conditions mentioned above may preferably be 300/mm$^2$ or less, particularly 250/mm$^2$ or less, more particularly 200/mm$^2$ or less, especially 150/mm$^2$ or less, or 100/mm$^2$ or less, or 50/mm$^2$ or less, or 30/mm$^2$ or less, or 10/mm$^2$ or less, still more preferably 0/mm$^2$.

The terms "crushed product" of a composition, "composition crushed product," or "crushed composition" herein refers to, unless otherwise specified, a composition crushed so as to have a particle size $d_{90}$ of from about 50 μm to about 1000 μm.

*Degree of Gelatinization of Starch:

The degree of gelatinization of starch in the composition of one or more embodiments of the present invention may preferably be equal to or higher than a predetermined value, from the viewpoint of improving the formability of the composition. Specifically, the degree of gelatinization of starch in the composition of one or more embodiments of the present invention may preferably be typically 30% or more, particularly 40% or more, more particularly 50% or more, still particularly 60% or more, especially 70% or more. The upper limit of the degree of gelatinization is not particularly limited, but this this value is too high, then the starch may decompose and render the resulting composition sticky. Therefore, the upper limit of the degree of gelatinization may preferably be 99% or less, particularly 95% or less, more particularly 90% or less. The degree of gelatinization in a composition herein can be measured using the Glucoamylase No. 2 method.

*Particle size $d_{90}$:

Various parameters relating to the particle size distribution of a composition, including the particle size $d_{90}$ after subjected to ultrasonic treatment, can be measured using a laser diffraction particle size analyzer according to the following conditions. Ethanol is used as the solvent for the measurement, which has little effect on the structure of the composition. The laser diffraction particle size analyzer used for the measurement is not limited to any particular type, an example being Microtrac MT3300 EXII system marketed by Microtrac Bell Inc. The measurement application software used for the measurement is not limited, an example being DMS2 (Data Management System version 2, Microtrac Bell Inc.). When the device and the application software mentioned above are used, the measurement can be carried out by: carrying out cleaning by pressing the Wash button of the software; carrying out calibration by pressing the Set Zero button of the software; and directly loading the sample via the Sample Loading feature until the sample concentration is within the proper range. After the sample is loaded, the measurement sample is subjected to ultrasonic treatment by the measurement device, followed by measurement. Specifically, a sample that has not been subjected to ultrasonic treatment is put into the measurement solvent (ethanol) circulating in the measurement system, the concentration is adjusted to within the appropriate range using the Sample Loading feature, and then the ultrasonic treatment is performed by pressing the Ultrasonic Treatment button of the software. Then, after three times of defoaming, the sample loading can be carried out again to adjust the concentration to within the appropriate range. Thereafter, the sample is promptly laser diffracted at a flow rate of 60% with a measurement time of 10 seconds, and the result is used as the measurement value. The parameters for the measurement may be, e.g., Distribution indication: Volume; Particle refractive index: 1.60; Solvent refractive index: 1.36; Upper limit of measurement: 2,000.00 μm; Lower limit of measurement: 0.021 μm.

The means for powdering pulse herein is not particularly limited. Specifically, the temperature during the miniaturization and powdering process is not particularly limited, but it may preferably be dried at a temperature of 200° C. or lower, for example, since if the powder is exposed to too high temperatures, the elasticity of the composition of one or more embodiments of the present invention tends to decrease. However, when pulse is used as the edible plant and heated before subjected to miniaturization and powdering for use, the temperature is not particularly limited since the heat load is reduced. The pressure during the miniaturization and powdering process is not limited, and may be chosen from high pressures, normal pressures, and low pressures. Examples of devices for the miniaturization process include, but are not limited to, blenders, mixers, mills, kneaders, crushers, disintegrators, and grinders. Specific examples that can be used include, for example, media stirring mills such as dry bead mills ball mills (rolling, vibrating, etc.), jet mills, high-speed rotating impact mills (pin mills, etc.), roll mills, hammer mills, etc.

*Non-Swollen Composition:

The composition of one or more embodiments of the present invention can exhibit its effects in the form a swollen food (especially not to a swollen food whose density specific gravity is less than 1.0 due to swelling), but also may be made into a non-swollen composition. The composition of one or more embodiments of the present invention according to this embodiment may be prepared by lowering the temperature while preventing swelling, and then lowering the pressure to about atmospheric pressure.

[II: Method for Producing Solid Paste Composition for Heat Cooking]

Another embodiment of one or more embodiments of the present invention relates to a method of producing the composition of one or more embodiments of the present invention (hereinafter also referred to as "the production method of one or more embodiments of the present invention").

(1) Summary

The method for producing the composition of one or more embodiments of the present invention is not particularly limited, and may be any method so long as it can produce a composition satisfying the requirements mentioned above. Specifically, the aforementioned ingredients of the composition of one or more embodiments of the invention, for example, edible plants such as legumes, can be mixed with other ingredients, seasonings, and other components used as desired. If necessary, the mixture may be subjected to heating, molding, or other processing. Among others, The composition of one or more embodiments of the present invention can be efficiently produced by a specific method involving preparing a paste dough composition by mixing the aforementioned materials so as to satisfy the aforementioned requirements, kneading the paste dough composition under predetermined high-temperature and high-pressure conditions, and then lowering the temperature of the composition so as not to swell (hereinafter also referred to as the "production method of one or more embodiments of the present invention" as appropriate).

Specifically, production method of one or more embodiments of the present invention comprises Steps (i) and (ii) below. The production method of one or more embodiments of the present invention also may contain Step (iii) below.

(i) preparing a paste dough composition having a starch content of 10.0 mass % or more in terms of dry mass basis, a protein content of 4 mass % or more in terms of dry mass basis, and a dry basis moisture content of 20 mass % or more; and (ii) kneading the composition prepared in step (i) at a temperature of from 110° C. to 190° C. with an SME of 400 kJ/kg or more under a pressure of 0.1 MPa or more.

(iii) cooling the composition kneaded in step (ii) to a temperature at which the composition does not swell.

The production method of one or more embodiments of the present invention will be explained in detail below.

(2) Step (i): Preparation of Paste Dough Composition

The dough composition of one or more embodiments of the present invention contains starch in an amount of a predetermined value or more such that the starch content in the final composition is adjusted to within a specific range. Specifically, the lower limit of the starch content in the composition according to one or more embodiments of the present invention in terms of dry mass basis may typically be 10 mass % or more, preferably 15 mass % or more, more preferably 20 mass % or more, particularly 25 mass % or more, more preferably 30 mass % or more, especially 35 mass % or more, still more preferably 40 mass % or more. On the other hand, the upper limit of the starch content in the composition according to one or more embodiments of the present invention in terms of dry mass basis is not particularly limited, but may be 85 mass % or less, particularly 80 mass % or less, or 70 mass % or less, or 60 mass % or less. The method for measuring this parameter is the same as that explained for the composition according to one or more embodiments of the present invention above.

The dough composition of one or more embodiments of the present invention contains protein in an amount of a predetermined value or more. Adjusting the protein content to a predetermined value or more is particularly desirable because this feature serves to adjust the proportion of low molecular components, which inhibit swelling of the starch structure during heat cooking as will be explained below, to within a certain range. Specifically, the lower limit of the protein content in the composition according to one or more embodiments of the present invention in terms of dry mass basis may typically be 4.0 mass % or more, preferably 5.0 mass % or more, more particularly 6.0 mass % or more, especially 7.0 mass % or more, or 8.0 mass % or more, or 9.0 mass % or more, or 10.0 mass % or more, or 11.0 mass % or more, or 12.0 mass % or more, or 13.0 mass % or more, or 14.0 mass % or more, or 15.0 mass % or more, or 16.0 mass % or more, or 17.0 mass % or more, or 18.0 mass % or more, or 19.0 mass % or more, or 20.0 mass % or more, still more preferably 21.0 mass % or more. On the other hand, the upper limit of the protein content in the composition according to one or more embodiments of the present invention in terms of dry mass basis is not particularly limited, but may typically be 85 mass % or less, preferably 80 mass % or less, more preferably 75 mass % or less, more preferably 70 mass % or less, more preferably 65 mass % or less, more preferably 60 mass % or less.

The starch and/or protein to be incorporated into the paste dough composition of one or more embodiments of the present invention may be pre-heated under conditions that include water. Specifically, it may be preferable to use starch and/or protein that has been heated at 110° C. to 190° C. in an environment with a dry mass basis moisture content of 20 mass % or more (more preferably 30 mass % or more, more preferably 40 mass % or more, more preferably 50 mass % or more), as this may facilitate the formation of the characteristic structure in the final solid paste composition for heat cooking. More preferably, both starch and protein have been heated beforehand (heating can be made, e.g., via steam heating). In addition, when powdered (e.g., to have a $d_{90}$ of <500 μm, more preferably a $d_{90}$ of <450 μm) starch-containing material is used, it may not be desirable to pre-heat the starch-containing raw powder (e.g., at 90° C. or more) in a dry environment with a dry mass basis moisture content of less than 25 mass %, since the local heating of starch promotes the solubilization of amylose in its structure, resulting in a sticky quality of the composition.

In addition, when a composition is made from such an overheated starch-containing material powder, or from powder derived from a material overheated in its un-powdered state, the resulting composition may be characterized in that the absorbance difference in the iodine solution (0.2 5 mM) treated with the composition in the non-crushed state and the crushed state are higher than 0.70 and 1.20, respectively, and the composition exhibits a sticky quality. Therefore, the absorbance difference in the iodine solution (0.2 5 mM) treated with the composition in the non-crushed state and the crushed state may preferably be 0.70 or lower and 1.20 or lower, respectively. The absorbance difference for the non-crushed composition may more preferably be 0.65 or less, more preferably 0.60 or less, more preferably 0.55 or less, more preferably 0.50 or less, more preferably 0.45 or less, more preferably 0.40 or less, more preferably 0.35 or less, more preferably 0.30 or less, more preferably 0.25 or less, still more preferably 0.20 or less. The absorbance difference for the crushed composition may more preferably be 1.10 or less, more preferably 1.00 or less, more preferably 0.90 or less, more preferably 0.80 or less, more preferably 0.70 or less, more preferably 0.60 or less, more preferably 0.50 or less, more preferably 0.40 or less, more preferably 0.30 or less. The lower limit of the absorbance difference in the iodine solution treated with the composition either in the non-crushed state or in the crushed state is not particularly limited, but may be typically −0.20 or more for the composition in each state. The absorbance differences mentioned above is determined by treating the composition with an iodine solution (unless otherwise specified, "0.5 mol/mL iodine solution" manufactured by FUJIFILM Wako Pure Chemicals Corporation is used after diluted with water) and measuring the absorbance of the resulting solution as will be explained below. Specifically, 1 mass of the composition (if there is any powder, etc. adhering to the surface of the composition, it should be removed prior to the measurement so as not to scratch the surface of the composition) is mixed with 9 masses of the iodine solution (25 mM) and allowed to stand at room temperature (20° C.) for 3 minutes, and then passed through a 20 μm filter (Millex-LG, 0.20 μm hydrophilic polytetrafluoroethylene ((PTFE), 13 mm) before subjected to absorbance measurement. Upon absorbance measurement, the absorbance (at 500 nm) of each of the iodine solution before addition of the composition (for calibration) and the filtrate of the iodine solution after addition of the composition is measured with an ordinary spectrophotometer (e.g., UV-1800 manufactured by Shimadzu Corporation) using a square cell with an optical path length of 10 mm, and the difference between the absorbances of the two samples {(the absorbance of the filtrate)−(the absorbance of the iodine solution)} is calculated to determine the content of soluble components.

In this connection, one or more embodiments of the present invention include a method of producing a solid paste composition for heat cooking, with controlling the heat history of starch throughout the manufacturing process such that the difference in the absorbance (500 nm) of the 10-time volume iodine solution (0.25 mM) treated with the composition in the starch in the non-crushed state and the crushed state to 0.70 or lower and 1.20 or lower, respectively.

(3) Step (ii): Kneading Treatment Under High-Temperature Conditions

The paste dough composition obtained in step (i) above is kneaded at a certain strength under specific high-temperature conditions. This strong kneading under high temperature conditions ensures that the percentage of specific components in the starch structure inside the composition is adjusted to within a specific range such that the features relating to MALDI-TOFMS imaging mass spectrometry mentioned above are satisfied. In particular, kneading under specific high-temperature and pressurized conditions is more desirable since it may make it easier to achieve the features mentioned above. The reason for this is not clear, but presumably because the processing under specific high-temperature conditions, preferably under high-temperature and pressurized conditions, may serve to enhance proper distribution of components identified by MALDI-TOFMS imaging mass spectrometry in the starch structure of the paste dough, whereby the effect of one or more embodiments of the invention may be achieved. It is possible that the effect is achieved. On the other hand, ordinary noodles made of refined starch as a raw material, such as cold noodles, contain only a very small amount of protein, so the resulting composition may not satisfy the aforementioned features, whereby the effect of one or more embodiments of the invention may not be achieved.

As for the specific conditions during kneading, the SME (specific mechanical energy) value calculated according to Equation I below may be 400 kJ/kg or more, since this may serve to break down the starch grains sufficiently to achieve a continuous structure with the starch in the composition leached from inside the starch grains. The SME value with which the kneading is carried out may preferably be 450 kJ/kg or more, more preferably 500 kJ/kg or more, more preferably 550 kJ/kg or more, more preferably 600 kJ/kg or more, more preferably 700 kJ/kg or more, still more preferably 800 kJ/kg or more. When an extruder is used for the kneading, screw rotation speed may preferably be set at higher than 150 rpm, more preferably higher than 200 rpm, still more preferably higher than 250 rpm. In addition, the aforementioned kneading may more preferably be carried out at such a high temperature as 110° C. or more (more preferably 120° C. or more), since the starch grain structure is more likely to be destroyed. When an extruder is used, the kneading at a high temperature with a high SME value as described above may preferably be carried out at 3% or more (more preferably 5% or more, still more preferably 8% or more, still more preferably 10% or more, still more preferably 15% or more, still more preferably 20% or more) of the total barrel length. Since the starch grain structures derived from pulse and seeds are more robust, the kneading at a high temperature with a high SME value as described above is more useful. The upper limit of the kneading temperature may preferably be 190° C. or less, more preferably 180° C. or less, more preferably 170° C. or less, most preferably 160° C. or less.

In addition, when the composition according to one or more embodiments of the present invention is produced, the kneading mentioned above is carried out under pressurized conditions relative to atmospheric pressure. The lower limit of the additional pressure to be applied relative to atmospheric pressure may preferably be 0.1 MPa or more, more particularly 0.3 MPa or more, more particularly 0.5 MPa or more, more particularly 1 MPa or more, more particularly 2 MPa or more, more particularly 3 MPa or more. On the other hand, the upper limit of the additional pressure to be applied during kneading may be set according to the requirements for pressure resistance of pressure equipment, but may be 50 MPa or less. When an extruder is used, the pressure applied during kneading can be determined and adjusted by measuring the outlet pressure of the extruder.

[Formula 2]

$$SME = \frac{\dfrac{N}{N_{max}} \times \dfrac{\tau - \tau_{empty}}{100}}{Q} \times P_{max} \times 3600 \qquad \text{Equation I}$$

N: Screw rotation speed during kneading (rpm)

$N_{max}$: Maximum screw speed (rpm)

T: Kneading torque/maximum torque (%)

$\tau_{empty}$: Idling torque/maximum torque (%)

Q: Total mass flow rate (kg/hr)

$P_{max}$: Maximum power of the agitator (e.g. extruder) (kW)

The kneading time can be determined appropriately based on various conditions such as the kneading temperature and pressure and the size of the kneading vessel. In particular, since the amount of heat applied to the composition varies greatly depending mainly on the characteristics of the apparatus used, it is preferable to determine the processing time such that the physical properties of the composition before and after the processing are adjusted to within their respective desired ranges mentioned above.

Specifically, the treatment in Step (ii) may preferably be carried out until the concentrations of the components identified by MALDI-TOFMS imaging mass spectrometry are adjusted to within the appropriate ranges. More specifically, the treatment in Step (ii) may preferably be carried out until the value α1 is adjusted to 16.0 or less and the value (α1)×(β1) is adjusted to 7.0 or less and/or until the value β1 is adjusted to 1.70 or less. In addition, the treatment in Step (ii) may preferably be carried out until the value α2 is adjusted to 16.0 or less and the value (α2)×(β2) is adjusted to 7.0 or less and/or until the value β2 is adjusted to 1.70 or less.

Generally, the lower limit of the kneading time may be typically 0.1 minutes or more, preferably 0.2 minutes or more, more preferably 0.3 minutes or more, more preferably 0.4 minutes or more, more preferably 0.5 minutes or more, more preferably 0.8 minutes or more, more preferably 1 minutes or more, more preferably 2 minutes or more, while the upper limit of the kneading time may be typically 60 minutes or less, preferably 30 minutes or less, more preferably 15 minutes or less.

It is a completely-unknown and surprising finding that subjecting the paste dough composition to kneading under such severe high-temperature and pressurized conditions serves to promote the softening of the composition during heat cooking and thereby shorten the heat cooking time, and also to suppress the stickiness of the composition during heat cooking and thereby render the resulting composition easier to cook.

(4) Step (iii): Cooling Treatment

If the composition after step (ii) above is depressurized without lowering the temperature, the water in the composition evaporates rapidly, causing the composition to swell. This is not preferable for preparing a non-swollen paste dough composition. Therefore, after the kneading under high temperature conditions, the composition temperature may be lowered to typically less than 110° C., preferably less than 105° C., more preferably less than 102° C., more preferably less than 100° C., to prevent the composition from swelling. In particular, this step of lowering the temperature may preferably be carried out under constant pressure conditions. In this case, the pressurization conditions during this temperature-lowering step are not particularly limited as long as swelling of the composition can be prevented, although they may preferably be the same as those during the kneading step. Specifically, the lower limit of the pressure to be applied during the temperature-lowering step may preferably be typically 0.1 MPa or more, preferably 0.3 MPa or more, more preferably 0.5 MPa or more, more preferably 1 MPa or more, more preferably 2 MPa or more, more preferably 3 MPa or more. On the other hand, the upper limit of the pressure to be applied during the temperature-lowering step may be 50 MPa or less.

It may further be preferable to lowering the outlet temperature setting of the extruder further while keeping the total mass flow rate to a predetermined level or more, since it increases the pressure during the kneading in step (ii) and thereby improves the stickiness of the resulting composition during heat cooking. If an extruder is used, these conditions can be adjusted as necessary so that the outlet pressure is adjusted to such a predetermined level or more, but the outlet temperature of the extruder may preferably be set at less than 90° C., more preferably less than 85° C., more preferably less than 80° C., more preferably less than 75° C., more preferably less than 70° C., more preferably less than 65° C., more preferably less than 60° C., more preferably less than 55° C., more preferably less than 50° C., more preferably less than 45° C., still more preferably less than 40° C. The total mass flow rate may preferably be 0.5 kg/hour or more, more preferably 0.7 kg/hour or more, still more preferably 1.0 kg/hour or more.

Specifically, the composition may preferably be retained at a temperature where the composition does not swell until its dry mass basis moisture content decreases to less than 25 mass % for 0.02 hours or more, more preferably 0.03 hours or more, more preferably 0.05 hours or more, more preferably 0.08 hours or more, or 0.1 hours or more, more preferably 0.2 hours or more, more preferably 0.4 hours or more, more preferably 0.8 hours or more, more preferably 1.0 hours or more, since this may provide the composition with preferred quality. This treatment can be achieved by a method involving adding moisture to the composition at any of the steps (i) to (iii) above to adjust the dry mass basis moisture content of the dough composition to 50 mass % or more. More specifically, adding water to the composition at step (i) is preferable. Water can be added either in the form of liquid water or in the form of steam, although it is preferable to add it in the form of liquid water.

As a water retention treatment, water may be added at Step (iii) and/or after Step (iii). Water can be added either in the form of water or steam, but it is preferable to add water in the form of water. Furthermore, even when the dry mass basis water content of the composition once decreases to 25 mass % or less, the water retention treatment may be continuously carried out by rehydrating to the dried composition to increase the dry mass basis water content. When the once-dried composition is rehydrated, the majority of the subsequent retention time may preferably be 60° C. or less, more preferably 50° C. or less, still more preferably 40° C. or less.

It is also possible to use a method of carrying out water retention treatment by increasing the ambient humidity at Step (iii) and/or after Step (iii) to thereby lengthen the time until the dry mass basis moisture content decreases to 25 mass %.

It is also possible to use a method of carrying out water retention treatment by decreasing the composition temperature to a predetermined temperature or less at Step (iii) and/or after Step (iii) to thereby lengthen the time until the dry mass basis moisture content decreases to 25 mass %. More specifically, during the majority of the time until the dry mass basis moisture content decreases to 25 mass %, the composition temperature may preferably be kept at 80° C. or less, particularly 70° C. or less, more preferably 60° C. or less, or 50° C. or less, or 40° C. or less. When the composition is produced using an extruder, the composition temperature may preferably have reached the temperature range mentioned above at least when the composition is extruded from the outlet of the extruder, and may more preferably be produced in the state where the outlet temperature is adjusted to the temperature range mentioned above.

It is also possible to use a method of carrying out water retention treatment by adjusting the duration period from the time when the interior temperature of the extruder is decreased to preferably less than 90° C. (more preferably less than 85° C., or less than 80° C., or less than 75° C., or less than 70° C., or less than 65° C., or less than 60° C., or less than 55° C., or less than 50° C., or less than 45° C., or less than 40° C.) at Step (ii) to the time when the dry mass basis moisture content decreases to less than 25 mass % at step (iii) is adjusted to 0.02 hours or more (more preferably 0.03 hours or more, or 0.05 hours or more, or 0.08 hours or more, or 0.1 hours or more, or 0.2 hours or more, or 0.4 hours or more, or 0.8 hours or more, or 1.0 hours or more). In this regard, the extruder used in Step (ii) may preferably have, downstream of the section where the internal set temperature of the extruder is increased to 110° C. or higher, a section where the dough is kneaded while the internal set temperature is decreased to less than 90° C., as this will further improve the stickiness of the resulting composition during heat cooking.

The composition temperature during the water retention treatment at Step (iii) and/or after Step (iii) may preferably be 90° C. or less, more preferably 80° C. or less, more preferably 70° C. or less, still more preferably 60° C. or less. The water retention treatment at Step (iii) and/or after Step (iii) may preferably be carried out under normal pressure.

(6) Extruder

When an extruder is used, 50 mass % or more of the total amount of moisture to be added during the production process may preferably be mixed with other ingredients before the interior of the extruder is heated to at least 20° C., since this may serve to prevent the starch from changing its properties due to overheating. This parameter may more preferably be 60% or more, more preferably 70 mass % or more, more preferably 80 mass % or more, more preferably 90 mass % or more, still more preferably 100 mass %. When the fraction of moisture is mixed with other raw materials in advance, this mixing may preferably be carried out to feed the mixture into the extruder. In addition, if water is fed into the extruder while the interior of the extruder is heated to 100° C. or higher, the water may boil off and damage the composition structure. Therefore, the aforementioned fraction of moisture may preferably be mixed with the raw material powder when the interior temperature of the extruder is less than 100° C. (more preferably less than 90° C., more preferably less than 80° C., more preferably less than 70° C., more preferably less than 60° C., more preferably less than 50° C., still more preferably less than 40° C.). In addition, the dough composition processed according to the above conditions (e.g., using an extruder) may be subjected to the step (i) mentioned above to produce the paste composition of one or more embodiments of the present invention. In this case, a part of the high-temperature, high-pressure severe kneading required for producing the paste composition of one or more embodiments of the present invention may be applied during the process of preparing the dough composition.

In addition, 50 mass % or more of the total amount of moisture to be added during the production process may preferably be mixed with other ingredients before the interior of the extruder is pressurized, since this may serve to prevent the starch from changing its properties due to overheating. This parameter may more preferably be 60 mass % or more, more preferably 70 mass % or more, more preferably 80 mass % or more, more preferably 90 mass % or more, still more preferably 100 mass %. This fraction of moisture may most preferably be mixed with other ingredients before the interior of the extruder is heated to 100° C. or more or pressurized.

The type of the extruder to be use is not limited, but may preferably be one which allows for the steps of water addition, severe kneading (with an SME value of at least 350 kJ/kg or more), heating, cooling, and extrusion molding in a single unit. Particularly preferred is an extruder with a structure that can add water to the raw material before heating and pressurization. Specifically, either a uniaxial extruder or a biaxial extruder can be used, but from the viewpoint of achieving strong kneading to promote the formation of the compositional structure of one or more embodiments of the invention, it is preferable to use a uniaxial extruder or a biaxial extruder instead of a common uniaxial extruder. On the other hand, the devices commonly referred to as uniaxial screw extruders or biaxial screw extruders (especially the devices referred to as extruder or twin screw extruder overseas) include extruders that merely has mixer and kneader functions, but such devices are not desirable in one or more embodiments of the present invention, since they cannot achieve strong kneading to form the composition structure of one or more embodiments of the present invention. In addition, when a raw material having a starch grain structure is used, the structure is so strong that a sufficient kneading force may not be achieved by using an ordinary extruder with a limited flight screw part in order for the starch grain structure to be completely destroyed. Therefore, it may be even more preferable to use an extruder that has a significantly higher number of barrel parts than usual that have a kneading effect. Specifically, the ratio of the length of the flight screw part to the total barrel length in the extruder may preferably be 95% or lower, since this serves to achieve the strong kneading of the composition and thereby accelerate the formation of the characteristic structure of the composition of one or more embodiments of the present invention. The flight screw part, also referred to as the transport element, means a part of the barrel having the most common shape. The higher its ratio to the total barrel length, the stronger the ability to push the dough composition toward the die, but the weaker the ability to knead the dough composition and promote its reaction. This parameter may more preferably be 90% or lower, even more preferably 85% or lower. Incidentally, when puffs and other swollen products are produced using an extruder, the composition must be extruded vigorously at high pressure (even when kneading is carried out at high SME values), which provides a motivation to increase the ratio of the flight screw part to the total barrel length, which is normally set at 95% to 100%. The part having the kneading effects may account for 5% or higher, more preferably 7% or higher, even more preferably 10% or higher, even more preferably 12% or higher of the total barrel length.

(7) Post-Treatment

The solid paste composition of one or more embodiments of the present invention can be obtained via Steps (i) and (ii) above, and optionally through Step (iii) above. However, the composition may be subjected to a further post treatment as necessary. Examples of such post-treatments include molding treatment and drying treatment, in addition to the water retention treatment mentioned above.

Examples of molding treatments include molding the solid paste composition into a desired form (e.g., pasta, Chinese noodles, udon, inaniwa udon, kishimen, houtou, suiton, hiyamugi, somen, soba, soba gaki, bee-hun, pho, reimen, vermicelli, oatmeal, couscous, kiritanpo, tteok, and gyoza skins, as mentioned above). Such a molding treatment can be carried out using methods normally known in the art. For example, in order to produce compositions in elongated shapes such as pasta, Chinese noodles, or other noodles, the composition can be extruded into elongated forms using an extruder or other devices described above. On the other hand, in order to produce compositions in flat plate shapes, the composition may be molded into flat plate shapes. Furthermore, the composition can be made into any shape such as elongated, granular, or flaky shapes, by, e.g., press-molding the composition or cutting or die-cutting the flat-plate shaped composition.

Drying treatment can be carried out by using any method generally used for drying foods. Examples include solar drying, drying in the shade, freeze drying, air drying (e.g., hot air drying, fluidized bed drying, spray drying, drum drying, low temperature drying, etc.), pressurized drying, decompressed drying, microwave drying, and oil heat drying. Preferable among these are air-drying (e.g., hot air drying, fluidized bed drying, spray drying, drum drying, low-temperature drying, etc.) and freeze-drying, since the degree of change in the color tone and flavor inherent in the food materials is small, and non-food aroma (e.g., burnt smell) can be controlled.

[II: Crushed Product of Solid Paste Composition for Heat Cooking and its Agglomerate]

The solid paste composition for heating and heat cooking of one or more embodiments of the present invention may be used after grinding the same. In other words, the production method of one or more embodiments of the present invention mentioned above may be modified by adding, after lowering the temperature in Step (ii) or (iii) above, the step of (iv) crushing the composition to prepare a crushed composition. The thus-obtained crushed product of the composition of one or more embodiments of the present invention (hereinafter also referred to as "the crushed composition of one or more embodiments of the present invention") also belongs to the subject matter of one or more embodiments of the present invention. When the composition of one or more embodiments of the present invention is crushed to produce the crushed composition of one or more embodiments of the present invention, the conditions for crushing are not particularly limited, but may preferably be adjusted such that the $d_{90}$ and/or $d_{50}$ of the resulting crushed composition is within the range of more than 50 μm and less than 1000 μm (more preferably less than 500 μm, more preferably less than 400 μm, more preferably less than 300 μm, more preferably less than 200 μm).

In addition, the crushed composition of one or more embodiments of the present invention may be used as a raw material and subjected to the high-temperature, high-pressure severe kneading treatment according to the production method of one or more embodiments of the present invention to thereby prepare an agglomerate. In other words, the production method of one or more embodiments of the present invention mentioned above may be modified by adding, after the crushing in step (iv), the step of (v) agglomerating the crushed composition to prepare a crushed composition agglomerate. The thus-obtained agglomerate of the crushed composition of one or more embodiments of the present invention (hereinafter also referred to as "the crushed composition agglomerate of one or more embodiments of the present invention") tends to achieve the composition satisfying the features defined by MALDI-TOFMS imaging mass spectrometry mentioned above, and is therefore suitable for use as a solid paste composition for heat cooking. The crushed composition agglomerate of one or more embodiments of the present invention also belongs to the subject matter of one or more embodiments of the present invention. When the composition of one or more embodiments of the present invention is crushed to prepare the crushed composition agglomerate of one or more embodiments of the present invention, the manufacture conditions therefor are the same as explained in Section [II] above.

EXAMPLES

One or more embodiments of the present invention will now be described in further detail by way of Examples. These examples are shown merely for convenience of the description, and should not be construed as limitations to the present invention in any sense.
[Method of Preparing Paste Dough Composition]

Dough compositions were prepared using raw materials which had been pre-processed under the conditions described in "Pre-Processing of Raw Materials" in the attached tables. The doughs were prepared by adding water as appropriate to achieve the "Measurements of Paste Dough Compositions" at the pre-processing step. When pulse flour is used as an ingredient, powder of bare beans from which seed skin was removed was used unless otherwise specified.
[Preparation of Solid Paste Compositions for Heat Cooking]

Samples of solid paste compositions for heat cooking of Test Examples and Comparative Examples were produced under the conditions described in the "Processing Conditions" column of the attached tables. Specifically, each sample was prepared using the equipment of the type indicated in the "Equipment Used" column and the barrel satisfying the parameter indicated in the "Flight Screw Part Ratio" section for kneading, with changing a part of the barrel sections ((1) to (9) in the attached tables) specified in the "Kneading Part" column to a part having a shape with a stronger kneading capacity, and setting the temperature of the part corresponding to "temperature conditions" to the values indicated in the attached tables (where (1) in the tables corresponds to the raw material inlet temperature and (9) in the tables corresponds to the outlet temperature). The biaxial extruder used was HAAKE Process11 from Thermo Fisher Scientific (screw diameter 11 mm×2, screw length 41 cm, segmented, co-directionally rotating screw), and the uniaxial extruder used as the one from NP Foods (screw diameter 70 mm×screw length 140 cm). The water was added by the method indicated in the "Water Injection Method" column, and the processing was carried out using the conditions indicated in the "Barrel Rotation Speed,"

"Mixing Strength (SME Value)," and "Internal Pressure (Pressure at the Outlet)" columns. No venting was performed during processing.

The compositions after processing were then subjected to drying treatment under the conditions described in "Period of time elapsed since the dough temperature decreased to less than 90° C. until the dry basis moisture content decreased to less than 25 mass %."

The samples of the solid paste compositions for heat cooking of Test Examples and Comparative Examples were also subjected to the analysis and the sensory evaluation shown below.
[Starch, Protein, Insoluble Dietary Fiber, and Dry Mass Basis Moisture Contents]

The "Starch" content was determined in accordance with the Japanese Standard Tables of Food Composition 2015 (7th revision) using the AOAC 996.11 method, after 80% ethanol extraction process to remove soluble carbohydrates (glucose, maltose, maltodextrin, etc.) that might otherwise have affect the measurement value. The "Protein" content was determined in accordance with the Japanese Standard Tables of Food Composition 2015 (7th revision) by multiplying the amount of nitrogen determined by the modified Kjeldahl method by the "nitrogen-protein conversion factor." The "Dry Mass Basis Moisture" content was determined in accordance with the Japanese Standard Tables of Food Composition 2015 (7th revision) using the decompression heating and drying method with heating to 90° C.
[MALDI-TOFMS Imaging Mass Spectrometry Analysis of Frozen Sections of Compositions Treated in Heated Water]
(Method for Preparing Samples)

For the analytical sample, about 1 g of the composition was put into about 1.0 L of boiled distilled water (90° C. or more) and boiled for 6 minutes, after which the sample was cut into about 2 mm by about 5 mm in lengths using dissecting scissors, and used for preparing a frozen block.
(Method for Producing Frozen Blocks)

Frozen blocks were prepared using a freeze embedding agent (SCEM from SECTION-LAB) for the Kawamoto method (described above) as the embedding agent, and Tissue-Tek <Cryomold 2> (from Sakura Finetech Japan Inc.) as the embedding dish.

The freeze-embedding agent was put into the embedding dish for frozen-section preparation, in which each sample was placed so that when the frozen section was prepared, the cut surface coincided with either the longitudinal axis of the composition (which corresponded to the direction of extrusion of the composition in the production process via extruder extrusion) or the transverse axis of the composition (which was perpendicular to the longitudinal axis).

Immediately after the sample was placed in the embedding medium, it was quickly frozen using a spray for rapid freezing of pathological tissues (White Freezer S for cryostat: UI Chemical Co., Ltd.) to maintain the installation state, and the frozen block was left in the freezing microtome (−25° C.) environment until section preparation.
(Method for Producing Sections) The resulting frozen block of each composition sample was fixed to a sample holder using Tissue-Tek OCT compound (from Sakura Finetech Japan Inc.) as the embedding agent for frozen section preparation. Then 30 μm-thick sections were prepared using a freezing microtome (Cryostar N X20, Thermo Fisher Scientific, Inc.) at −25° C.

Each frozen section was attached to a glass slide for imaging MS (ITO glass slide, manufactured by Bruker) and subjected to analysis.

(Imaging Mass Spectrometry Analysis)

A rapiflex (Bruker) was used as the MALDI TOFMS analyzer for imaging mass spectrometry, and a GT-X830 scanner (EPSON) was used for image scanning at 6400 dpi. An analysis software flexControl (Bruker) was used, the measurement conditions were set as follows. Laser frequency: 10 kHz; Laser Power: 100; Number of Shots: 500; Sensitivity Gain: 26×(2905V); Scan Range: X=5 μm, Y=5 m; Resulting Field Size: X=9 μm, Y=9 m; and the imaging area was set so as to surround the entire composition cross section.

A matrix suitable for the object to be measured was used as the matrix for analysis, and sprayed using TM-Sprayer (HTX Technologies, LLC) under spray conditions of 70° C. and 10 sprays.

For the measurement of the value [α](the ratio of the signal intensity at m/z=213.38 ([213.38]) to the signal intensity at m/z=788.37 ([788.37]) on the cross section of the composition; also referred to as [213.38]/[788.37]), the matrix for analyzing low molecular substances, i.e., α-cyano-4-hydroxycinnamic acid, was dissolved into a 70% acetonitrile solution containing 0.1% TFA, and 1 mL of the resulting solution was sprayed onto a glass slide, and then dried under reduce pressure in a desiccator for 10 minutes before use.

For the measurement of the value [0](the ratio of the signal intensity at m/z=12345.17 ([12345.17]) to the signal intensity at m/z=5962.70 ([5962.70]) on the cross section of the composition; also referred to as [12345.17]/[5962.70]), the matrix for analyzing macromolecular substances, i.e., sinapinic acid, was sprayed via a two-step atomization according to Bruker's protocol. Specifically, 2 mL of a solution of sinapinic acid dissolved in ethanol (10 mg/mL) was sprayed onto a frozen section placed on an IOT glass slide, and then dried in a decompression desiccator for 10 minutes. Subsequently, 2 mL of a solution of sinapinic acid dissolved in 30% acetonitrile (60 mg/mL) was sprayed onto the frozen section, and then dried in a decompression desiccator for 10 minutes before use.

(Signal Intensity Analysis)

Signal intensity analysis was performed using Fleximage. Specifically, the signal intensity of m/z±0.1 for each target substance was displayed in terms of the shading of white in the image, and the signal intensity of each target substance was determined by measuring the intensity of the white color in the cross-sectional image of the composition (thus, a background with no signal was displayed in black). More specifically, imageJ was used as the image analysis software, and the signal intensity was measured by specifying the measurement points so as to surround the entire cross-sectional image of the composition.

[Number of Starch Grain Structures]

The composition sample was crushed with a mill and filtered through a 150-μm pass opening. 3 mg of the resulting composition powder was suspended in 5 μL of water to prepare 6% aqueous suspension, which was dropped onto a glass slide, on which a cover glass was placed and lightly pressurized over to produce a preparative plate.

The number of starch grain structures in the field of view was determined by polarized light observation of representative sites in the preparative plate using a phase contrast microscope (ECLIPSE80i, Nikon) at 200× magnification.

[Sensory Evaluation]

One mass of each composition sample prepared as described above and one mass of commercially available mung bean harusame (Japanese vermicelli) as a comparative sample were cooked in 9 masses of water at 90° C. for 5 minutes, and sensory evaluation was conducted on the heat cooking and physical properties of each of the cooked product. Specifically, the compositions were cooked, and 10 trained sensory inspectors observed the compositions during heat cooking and evaluated their heat cooking and physical properties from the perspectives of "Softening property of the composition during heat cooking," "Improvement of stickiness of the composition during heat cooking," and "Overall evaluation," in accordance with the following criteria. The average of the scores of 10 sensory inspectors was calculated for each evaluation item, and rounded off to the first decimal place to obtain the final score.

*Evaluation Criteria for "Softening Property of the Composition During Heat Cooking":

The heat cooking property of each composition sample was evaluated in comparison to the texture of mung bean harusame (commercial product) on the following one-to-five scale.

5: The composition exhibited an excellent softening property during heat cooking, being clearly superior to the commercial product.

4: The composition exhibited a good softening property during heat cooking, being considerably superior to the commercially available product.

3: The composition exhibited a moderate softening property during heat cooking, being superior to the commercially available product.

2: The composition exhibited a limited softening property during heat cooking, being slightly superior to the commercially available product.

1: The composition exhibited a poor softening property during heat cooking, being equal to the commercially available product.

*Evaluation Criteria for "Improvement of Stickiness of the Composition During Heat Cooking":

The heat cooking property of each composition sample was evaluated in comparison to the texture of mung bean harusame (commercial product) on the following one-to-five scale.

5: No pieces of the composition stuck together at all during heat cooking, being clearly superior to the commercial product.

4: Only a few pieces of the composition stuck together during heat cooking, being considerably superior to the commercially available product.

3: About a half of the pieces of the composition stuck together during heat cooking, being superior to the commercially available product.

2: Most pieces of the composition stuck together during heat cooking, being slightly inferior to the commercially available product.

1: Almost all pieces of the composition stuck together during heat cooking, being inferior to the commercially available product.

*Evaluation Criteria for "Overall Evaluation":

The property and taste of each composition sample were evaluated in comparison to the texture of mung bean harusame (commercial product) on the following one-to-five scale.

5: The composition exhibited an excellent softening property and a significant improvement in its stickiness, being clearly superior to the commercial product.

4: The composition exhibited a good softening property and a clear improvement in its stickiness, being considerably superior to the commercially available product.

3: The composition exhibited a moderate softening property and some improvement in its stickiness, being superior to the commercially available product.

2: The composition exhibited a limited softening property and little improvement in its stickiness, being slightly inferior to the commercially available product.

1: The composition exhibited a poor softening property and no improvement in its stickiness, being inferior to the commercially available product.

[Constituents, Manufacture Conditions, and Evaluation Results]

The constituents, measurements and properties of the composition sample of each of the Examples and Comparative Examples are shown in Tables 1-1 and 1-2, the manufacturing conditions for each sample are shown in Tables 2-1 and 2-2, and the evaluation results of each sample are shown in Tables 3-1 and 3-2. The number of starch grain structures observed in a 6% suspension of each of the compositions in the crushed state was 300/mm$^2$ or more in Comparative Examples 1 and 3, and less than 300/mm$^2$ in all other examples.

TABLE 1-1

| | | Measurements for Paste Dough Composition | | | | | | |
| | | Starch | | | Protein | | | |
| | Pre-treatment of Raw Materials | Source material (main raw material) | mass % | Ratio of starch contained in edible plant to total starch content mass % | Source material (main raw material) | mass % | Ratio of protein contained in edible plant to total protein content mass % | Dry basis moisture content mass % |
|---|---|---|---|---|---|---|---|---|
| Example 1 | Dried yellow pea flour (d90 < 150 μm, Pin mill) | Yellow pea | 33 | 100 | Yellow pea | 12 | 100 | 50 |
| Example 2 | Dried yellow pea flour (d90 < 150 μm, Pin mill) | Yellow pea | 33 | 100 | Yellow pea | 12 | 100 | 50 |
| Example 3 | Dried yellow pea flour (d90 < 150 um, Pin mill) | Yellow pea | 33 | 100 | Yellow pea | 12 | 100 | 50 |
| Example 4 | Dried yellow pea flour (d90 < 150 μm, Pin mill) | Yellow pea | 33 | 100 | Yellow pea | 12 | 100 | 60 |
| Example 5 | Dried mug bean flour (d90 < 500 μm, Air stream mill) | mug bean | 27.5 | 100 | mug bean | 20 | 100 | 40 |
| Example 6 | Dried white pea flour (d90 < 500 μm, Pin mill) | White pea | 37.9 | 100 | White pea | 13.0 | 100 | 60 |
| Example 7 | Dried yellow pea flour with seed skin (d90 < 50 μm, Pin mill) | Yellow pea | 32.0 | 100 | Yellow pea | 13.0 | 100 | 30 |
| Example 8 | Purified mug bean starch + Purified pea protein | mug bean | 34.7 | 0 | mug bean | 28 | 20 | 50 |
| Example 9 | Purified wheat starch + Purified pea protein | Wheat | 34.7 | 20 | Wheat | 28 | 40 | 50 |
| Example 10 | Purified pea starch + Purified pea protein | Yellow pea | 60 | 40 | Yellow pea | 10 | 60 | 50 |
| Example 11 | Purified peaa starch + Pumpkin seeds protein | Yellow pea | 35.7 | 60 | Pumpkin seeds | 12.9 | 80 | 40 |

45

TABLE 1-2

| | | Measurements for Paste Dough Composition | | | | | | |
| | | Starch | | | Protein | | | |
| | Pre treatment of Raw Materials | Source material (main raw material) | mass % | Ratio of starch contained in edible plant to total starch content mass % | Source material (main raw material) | mass % | Ratio of protein contained in edible plant to total protein content mass % | Dry basis moisture content mass % |
|---|---|---|---|---|---|---|---|---|
| Example 12 | Purified pea starch + Hemp seeds protein | Yellow pea | 39.3 | 80 | Hemp seeds | 14.3 | 100 | 40 |
| Example 13 | Yellow pea flour + Purified pea protein | Yellow pea | 26.8 | 100 | Yellow pea | 30.2 | 26 | 50 |
| Example 14 | Yellow pea flour + Purified pea protein | Yellow pea | 19.3 | 100 | Yellow pea | 39.3 | 16 | 50 |
| Example 15 | Yellow pea flour + Purified pea protein | Yellow pea | 12.9 | 100 | Yellow pea | 46.4 | 8 | 50 |
| Example 16 | Dried yellow pea flour (d90 < 50 μm, Pin mill) | Yellow pea | 35.0 | 90 | Yellow pea | 22.0 | 90 | 50 |

TABLE 1-2-continued

| | | Measurements for Paste Dough Composition | | | | | | |
| | | Starch | | | Protein | | | |
| | Pre treatment of Raw Materials | Source material (main raw material) | mass % | Ratio of starch contained in edible plant to total starch content mass % | Source material (main raw material) | mass % | Ratio of protein contained in edible plant to total protein content mass % | Dry basis moisture content mass % |
|---|---|---|---|---|---|---|---|---|
| Examples 17 | Crushed product of the composition of Example 1 (d90 < 200 μm, Pin mill) | Yellow pea | 43 | 100 | Yellow pea | 15 | 100 | 20 |
| Comparative Example 1 | Dried yellow pea flour (d90 < 150 μm, Pin mill) | Yellow pea | 33 | 100 | Yellow pea | 12 | 100 | 50 |
| Comparative Example 2 | Dried yellow pea flour (d90 < 150 μm, Pin mill) | Yellow pea | 33 | 100 | Yellow pea | 12 | 100 | 50 |
| Comparative Example 3 | Dried yellow pea flour (d90 < 250 μm, air stream) -> Treated with dry basis moisture content of 50%, maximum temperature of 150° C., and SmE of 300 kJ/kg -> Dried until dry basis moisture content decreased to below 10%, then crushed (d90 < 250 μm, Pin mill) | Yellow pea | 30 | 100 | Yellow pea | 12 | 100 | 50 |
| Comparative Example 4 | Purified pea starch + Purified pea protein | Yellow pea | 66 | 0 | Yellow pea | 3 | 0 | 50 |

TABLE 2-1

| | | Processing Conditions | | | | | | |
| | | Equipment used | | | Temperature conditions for each barrel section | | | |
| | Type of equipment | Flight screw part ratio % | Kneading Sections | Water injection method | (1) (Inlet temp.) ° C. | (2) ° C. | (3) ° C. | (4) ° C. |
|---|---|---|---|---|---|---|---|---|
| Example 1 | Biaxial extuder | 60 | (4), (6) | All water added with raw material powder at (1) | — | 90 | 100 | 120 |
| Example 2 | Biaxial extruder | 60 | (4), (6) | All water added with raw material powder at (1) | — | 90 | 90 | 140 |
| Example 3 | Biaxial extruder | 60 | (4), (6) | All water added with raw material powder at (1) | — | 90 | 90 | 160 |
| Example 4 | Biaxial extruder | 60 | (4), (6) | All water added with raw material powder at (1) | — | 90 | 140 | 180 |
| Example 5 | Biaxial extruder | 80 | (4), (6) | All water added with raw material powder at (1) | — | 90 | 100 | 120 |
| Example 6 | Biaxial extruder | 80 | (4), (6) | All water added with raw material powder at (1) | — | 90 | 100 | 120 |
| Example 7 | Uniaxial extruder | 40 | (4), (5), (8), (7) | All water added with raw material powder at (1) | — | 90 | 100 | 120 |
| Example 8 | Biaxial extruder | 80 | (4), (6) | All water added with raw material powder at (1) | — | 90 | 100 | 120 |
| Example 9 | Biaxial extruder | 80 | (4), (6) | All water added with raw material powder at (1) | — | 90 | 90 | 120 |
| Example 10 | Biaxial extruder | 80 | (4), (6) | All water added with raw material powder at (1) | — | 90 | 100 | 120 |
| Example 11 | Biaxial extruder | 80 | (4), (6) | All water added with raw material powder at (1) | — | 90 | 100 | 120 |

TABLE 2-1-continued

| | | | | | | Processing Conditions | | |
|---|---|---|---|---|---|---|---|---|
| | Temperature conditions for each barrel section | | | | | | Pressure applied | Time duration after dough temperature decreased to below |
| | (5) °C. | (6) °C. | (7) °C. | (8) °C. | (9) (Outlet temp.) °C. | Kneading strength (SME) kJ/kg | inside (pressure near MPa | 90° C. until dry basis moisture content became Hours |
| Example 1 | 120 | 120 | 120 | 95 | 55 | 904 | 12.0 | 0.1 |
| Example 2 | 140 | 140 | 140 | 95 | 55 | 850 | 10.4 | 0.1 |
| Example 3 | 180 | 160 | 180 | 95 | 55 | 804 | 11.8 | 0.1 |
| Example 4 | 180 | 180 | 180 | 130 | 55 | 750 | 5.5 | 0.02 |
| Example 5 | 120 | 120 | 120 | 90 | 60 | 940 | 6.6 | 0.05 |
| Example 6 | 120 | 120 | 120 | 95 | 70 | 850 | 4.8 | 0.05 |
| Example 7 | 120 | 120 | 120 | 95 | 50 | 500 | 2.4 | 0.1 |
| Example 8 | 120 | 120 | 120 | 95 | 80 | 463 | 6.6 | 0.03 |
| Example 9 | 120 | 120 | 120 | 100 | 80 | 558 | 6.5 | 0.02 |
| Example 10 | 120 | 120 | 120 | 95 | 80 | 726 | 8.3 | 0.03 |
| Example 11 | 120 | 120 | 120 | 95 | 60 | 1120 | 12.6 | 1 |

TABLE 2-2

| | | Processing Conditions | | | | | | |
|---|---|---|---|---|---|---|---|---|
| | Equipment used | | | | Temperature conditions for each barrel section | | | |
| | Type of equipment | Flight screw part ratio % | Kneading Sections | Water injection method | (1) (Inlet temp.) °C. | (2) °C. | (3) °C. | (4) °C. |
| Example 12 | Biaxial extruder | 80 | (4), (6) | All water added with raw material powder at (1) | — | 90 | 100 | 120 |
| Example 13 | Biaxial extruder | 80 | (4), (6) | All water added with raw material powder at (1) | — | 90 | 100 | 120 |
| Example 14 | Biaxial extruder | 80 | (4), (6) | All water added with raw material powder at (1) | — | 90 | 100 | 120 |
| Example 15 | Biaxial extruder | 80 | (4), (6) | All water added with raw material powder at (1) | — | 90 | 100 | 120 |
| Example 16 | Biaxial extruder | 80 | (4), (6) | All water added with raw material powder at (1) | — | 90 | 100 | 120 |
| Example 17 | Uniaxial extruder | 40 | (4), (5), (6), (7) | All water added with raw material powder at (1) | — | 90 | 100 | 120 |
| Comparative Example 1 | Biaxial extruder | 60 | (4), (6) | All water added with raw material powder at (1) | — | 60 | 80 | 80 |
| Comparative Example 2 | Biaxial extruder | 60 | (4), (6) | All water added with raw material powder at (1) | — | 90 | 140 | 200 |
| Comparative Example 3 | Biaxial extruder | 100 | — | All water added with raw material powder at (1) | — | 90 | 100 | 120 |
| Comparative | Biaxial extruder | 80 | (4), (6) | All water added with raw material powder at (1) | — | 90 | 100 | 120 |

| | | | | | | Processing Conditions | | |
|---|---|---|---|---|---|---|---|---|
| | Temperature conditions for each barrel section | | | | | | Pressure applied | Time duration after dough temperature decreased to below |
| | (5) °C. | (6) °C. | (7) °C. | (8) °C. | (9) (Outlet temp.) °C. | Kneading strength (SME) kJ/kg | inside (pressure near MPa | 90° C. dry basis moisture content became Hours |
| Example 12 | 120 | 120 | 120 | 95 | 60 | 1210 | 15.2 | 2 |
| Example 13 | 120 | 120 | 120 | 95 | 60 | 1135 | 10.5 | 0.5 |
| Example 14 | 120 | 120 | 120 | 95 | 60 | 1065 | 9.5 | 0.5 |
| Example 15 | 120 | 120 | 120 | 95 | 60 | 985 | 8.1 | 0.5 |
| Example 16 | 120 | 120 | 120 | 95 | 60 | 1250 | 9.1 | 16 |
| Example 17 | 120 | 120 | 120 | 95 | 40 | 680 | 10.5 | 0.05 |

TABLE 2-2-continued

| | | | | | | | | |
|---|---|---|---|---|---|---|---|---|
| Comparative Example 1 | 80 | 80 | 80 | 80 | 55 | 1040 | 7.0 | 0.5 |
| Comparative Example 2 | 200 | 200 | 200 | 100 | 55 | 730 | 4.5 | 0.01 |
| Comparative Example 3 | 120 | 120 | 120 | 95 | 80 | 270 | 1.5 | 0.1 |
| Comparative Example 4 | 120 | 120 | 120 | 95 | 80 | 789 | 8.6 | 0.03 |

TABLE 3-1

| | | | | | Measurements for Composition | | |
|---|---|---|---|---|---|---|---|
| | | | Dry basis moisture content mass % | | Imaging mass spectrum of longitudial frosen section | | |
| | Starch mass % | Protein mass % | | Shape of Composition | [213.38]/ [788.37] (α1) | [12345.17]/ [5962.70] (β1) | α1 × β1 |
| Example 1 | 51.4 | 18 | 5 | Noodles with 1 mm diameter | 0.88 | 0.45 | 0.30 |
| Example 2 | 52.5 | 18 | 4 | Noodles with 1 mm diameter | 1.01 | 0.47 | 0.47 |
| Example 3 | 52 | 18 | 5 | Noodles with 1 mm diameter | 1.34 | 0.56 | 0.75 |
| Example 4 | 49.5 | 18 | 6 | Noodles with 1 mm diameter | 1.70 | 0.64 | 1.09 |
| Example 5 | 39.9 | 25 | 6 | Noodles with 2 mm thickness | 1.03 | 0.27 | 0.28 |
| Example 6 | 55 | 21 | 5 | Noodles with 1 mm diameter | 2.07 | 0.23 | 0.47 |
| Example 7 | 45 | 19 | 6 | Noodles with 1 mm diameter | 1.43 | 0.44 | 0.63 |
| Example 8 | 55 | 38 | 7 | Noodles with 2 mm diameter | 0.04 | 0.38 | 0.01 |
| Example 9 | 60 | 32 | 5 | Noodles with 2 mm diameter | 0.25 | 0.52 | 0.13 |
| Example 10 | 80 | 13 | 5 | Noodles with 1 mm diameter | 8.73 | 0.74 | 4.97 |
| Example 11 | 50 | 18 | 8 | Noodles with 10 mm diameter | 4.92 | 0.76 | 3.81 |

| | Measurements for Composition | | | Sensory Evaluation | | |
|---|---|---|---|---|---|---|
| | Imagaing mass spectrum of transverse frosen section | | | Softening property of the | Improvement of stickiness of the | |
| | [213.38]/ [788.37] (α2) | [12345.17]/ [5962.70] (β2) | α2 × β2 | composition during heat cooking | composition during heat cooking | Overall evaluation |
| Example 1 | 0.65 | 0.77 | 0.50 | 5 | 5 | 5 |
| Example 2 | | | | 5 | 5 | 5 |
| Example 3 | | | | 5 | 5 | 5 |
| Example 4 | | | | 5 | 5 | 5 |
| Example 5 | | | | 5 | 5 | 5 |
| Example 6 | | | | 5 | 5 | 5 |
| Example 7 | 0.95 | 0.95 | 0.91 | 5 | 5 | 5 |
| Example 8 | | | | 5 | 5 | 5 |
| Example 9 | | | | 5 | 5 | 5 |
| Example 10 | | | | 4 | 4 | 4 |
| Example 11 | | | | 4 | 4 | 4 |

TABLE 3-2

| | | | Dry basis moisture content mass % | | Imaging mass spectrum of longitudinal frosen section | | |
| | Starch mass % | Protein mass % | | Shape of Composition | [213.38]/ [788.37] ($\alpha$1) | [12345.17]/ [5962.70] ($\beta$1) | $\alpha$1 × $\beta$1 |
|---|---|---|---|---|---|---|---|
| | | | | | Measurements for Composition | | |
| Example 12 | 55 | 20 | 5 | Granules with 30 mm diameter | 2.23 | 1.20 | 2.67 |
| Example 13 | 39 | 45 | 5 | Noodles with 1 mm diameter | 0.42 | 0.68 | 0.29 |
| Example 14 | 29 | 59 | 5 | Noodles with 1 mm diameter | 1.84 | 0.79 | 1.46 |
| Example 15 | 19 | 73 | 5 | Noodles with 1 mm diameter | 1.04 | 1.77 | 1.56 |
| Example 16 | 67 | 52 | 5 | Plates with 5 mm thickness | 1.04 | 1.50 | 1.56 |
| Example 17 | 51 | 18 | 5 | Noodles with 1 mm diameter | 0.12 | 0.27 | 0.03 |
| Comparative Example 1 | 50.4 | 18 | 6 | Noodles with 1 mm diameter | 21.11 | 1.47 | 31.07 |
| Comparative Example 2 | 58 | 18 | 6 | Noodles with 1 mm diameter | 6.70 | 1.86 | 7.15 |
| Comparative Example 3 | 49 | 18 | 7 | Thread-like shape | 18.59 | 0.68 | 12.71 |
| Comparative Example 4 | 91 | 3 | 5 | Noodles with 1 mm diameter | 34.30 | 0.73 | 25.08 |

| | Measurements for Composition | | | Sensory Evaluation | | |
| | Imagaing mass spectrum of transverse frosen section | | | Softening property of the | Improvement of stickiness of the | |
| | [213.38]/ [788.37] ($\alpha$2) | [12345.17]/ [5962.70] ($\beta$2) | $\alpha$2 × $\beta$2 | composition during heat cooking | composition during heat cooking | Overall evaluation |
|---|---|---|---|---|---|---|
| Example 12 | | | | 5 | 4 | 4 |
| Example 13 | | | | 5 | 5 | 5 |
| Example 14 | | | | 5 | 4 | 4 |
| Example 15 | | | | 5 | 3 | 3 |
| Example 16 | | | | 5 | 5 | 5 |
| Example 17 | | | | 5 | 5 | 5 |
| Comparative Example 1 | | | | 2 | 2 | 2 |
| Compartative Example 2 | | | | 4 | 1 | 1 |
| Comparative Example 3 | | | | 2 | 2 | 1 |
| Comparative Example 4 | | | | 1 | 2 | 2 |

INDUSTRIAL APPLICATION

The solid paste composition for heat cooking according to one or more embodiments of the present invention requires less time to cook because of its improved softening property during heat cooking, and is easy to cook because of its suppressed property of sticking together during heat cooking. Therefore, one or more embodiments of the present invention is expected to be applied widely in the food industry.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A process of producing a solid paste composition for heat cooking, comprising:

(i) preparing a paste dough composition comprising a pulse-derived flour, wherein the pulse is selected from the group consisting of yellow peas, white peas, green peas, and combinations thereof and the paste dough composition has a starch content of 30 mass % or more and 70 mass % or less in terms of dry mass basis, a protein content of 10 mass % or more and 60 mass % or less in terms of dry mass basis, and a dry basis moisture content of 20 mass % or more and 60 mass % or less, wherein:

100 mass % of the total amount of moisture to be added during the producing the solid paste composition is mixed with other ingredients prior to feeding the paste dough composition into an extruder, or 100 mass % of the total amount of moisture to be added during the producing the solid paste composition is mixed with other ingredients in the extruder when an interior temperature of the extruder is less than 40° C.; and (ii) kneading the composition prepared in step (i) in the extruder at a temperature of from 110° C. to 190° C. with an SME of 400 kJ/kg or more under a pressure of 2 MPa or more, thereby forming the solid paste composition, wherein:

the solid paste composition comprises a starch content of in terms of dry mass basis 30 mass % or more and 70 mass % or less and a protein content of in terms of dry mass basis 10 mass % or more and 60 mass % or less; and the solid paste composition is pasta.

2. The process according to claim 1, further comprising, after step (ii): (iii) cooling the composition kneaded in step (ii) to a temperature of less than 110° C.

3. The process according to claim 2, wherein in step (iii), the composition is maintained for a continuous period of 0.02 hour or more from when the temperature fell below 90° C. until when the dry basis moisture content fell below 25 mass %.

4. The process according to claim 2, wherein the kneading in step (ii) and/or the cooling in step (iii) are/is carried out using the extruder, wherein a ratio of a length of a flight screw part to a total length of a barrel of the extruder is 90% or less.

5. The process according to claim 2, further comprising, after step (iii):

(iv) crushing the composition to produce a crushed composition.

6. The process according to claim 5, further comprising, after step (iv):

(v) agglomerating the crushed composition to produce a crushed composition agglomerate.

7. The process according to claim 1, wherein the paste dough composition has a starch content of 30 mass % or more and 60 mass % or less in terms of dry mass basis, a protein content of 10 mass % or more and 60 mass % or less in terms of dry mass basis, and a dry basis moisture content of 40 mass % or more and 60 mass % or less.

8. The process according to claim 5, wherein a number of starch grain structures observed in the solid paste composition is 300/mm$^2$ or less when a 6% suspension of the crushed composition is observed.

9. The process according to claim 1, wherein the pulse-derived flour has a particle size $d_{90}$ of less than 500 μm after being subjected to ultrasonic treatment.

10. A process of producing a solid paste composition for heat cooking, comprising:

(i) preparing a paste dough composition consisting essentially of a pulse-derived flour and water, wherein the pulse is selected from the group consisting of yellow peas, white peas, green peas, and combinations thereof and the paste dough composition has a starch content of 30 mass % or more and 70 mass % or less in terms of dry mass basis, a protein content of 10 mass % or more and 60 mass % or less in terms of dry mass basis, and a dry basis moisture content of 40 mass % or more and 60 mass % or less, wherein:

100 mass % of the total amount of moisture to be added during the producing the solid paste composition is mixed with other ingredients prior to feeding the paste dough composition into an extruder, or 90 mass % or more of the total amount of moisture to be added during the producing the solid paste composition is mixed with other ingredients in the extruder when an interior temperature of the extruder is less than 40° C.;

(ii) kneading the composition prepared in step (i) in the extruder at a temperature of from 110° C. to 190° C. with an SME of 400 kJ/kg or more under a pressure of 2 MPa or more;

(iii) cooling the composition kneaded in step (ii) to a temperature of less than 110° C.; and (iv) maintaining the composition for a continuous period of 0.02 hour or more from when the temperature fell below 90° C. until when the dry basis moisture content fell below 25 mass %, thereby forming the solid paste composition, wherein:

the solid paste composition comprises a starch content of in terms of dry mass basis 30 mass % or more and 70 mass % or less and a protein content of in terms of dry mass basis 10 mass % or more and 60 mass % or less; and the solid paste composition is pasta.

11. A process of producing a solid paste composition for heat cooking, comprising:

(i) preparing a paste dough composition consisting of a pulse-derived flour, water, and a food additive, wherein the pulse is selected from the group consisting of yellow peas, white peas, green peas, and combinations thereof, the food additive is selected from the group consisting of pH adjusters, minerals, artificial sweeteners, antioxidants, thickening stabilizers, emulsifiers, and combinations thereof and the paste dough composition has a starch content of 30 mass % or more and 60 mass % or less in terms of dry mass basis, a protein content of 10 mass % or more and 60 mass % or less in terms of dry mass basis, and a dry basis moisture content of 40 mass % or more and 60 mass % or less, wherein:

100 mass % of the total amount of moisture to be added during the producing the solid paste composition is mixed with other ingredients prior to feeding the paste dough composition into an extruder, or 100 mass % of the total amount of moisture to be added during the producing the solid paste composition is mixed with other ingredients in the extruder when an interior temperature of the extruder is less than 40° C.;

(ii) kneading the composition prepared in step (i) in the extruder at a temperature of from 110° C. to 190° C. with an SME of 700 kJ/kg or more under a pressure of 5.5 MPa or more;

(iii) cooling the composition kneaded in step (ii) to a temperature of less than 110° C.; and (iv) maintaining the composition for a continuous period of 0.02 hour or more from when the temperature fell below 90° C. until when the dry basis moisture content fell below 25 mass %, thereby forming the solid paste composition, wherein:

the kneading in step (ii) and/or the cooling in step (iii) are/is carried out using the extruder, wherein a ratio of a length of a flight screw part to a total length of a barrel of the extruder is 90% or less;

the solid paste composition comprises a starch content of in terms of dry mass basis 30 mass % or more and 60 mass % or less and a protein content of in terms of dry mass basis 10 mass % or more and 60 mass % or less; and the solid paste composition is pasta.

12. The process according to claim 1, wherein the pulse is yellow peas.

13. The process according to claim 1, wherein the paste dough composition consists of the pulse-derived flour.

14. The process according to claim 13, wherein the pulse is yellow peas.

15. The process according to claim 7, wherein the solid paste composition comprises a starch content of in terms of dry mass basis 30 mass % or more and 60 mass % or less and a protein content of in terms of dry mass basis 10 mass % or more and 21 mass % or less.

16. The process according to claim 1, kneading the composition with the SME of 700 kJ/kg or more under the pressure of 5.5 MPa or more.

17. The process according to claim 10, the pulse is yellow peas.

18. The process according to claim 11, wherein the pulse is yellow peas.

19. A process of producing a solid paste composition for heat cooking, comprising:

(i) preparing a paste dough composition consisting essentially of a pulse-derived flour and water, wherein the pulse is selected from the group consisting of yellow peas, white peas, green peas, soybeans, chickpeas, lentils, and combinations thereof and the paste dough composition has a starch content of 30 mass % or more and 60 mass % or less in terms of dry mass basis, a protein content of 10 mass % or more and 21 mass % or less in terms of dry mass basis, and a dry basis moisture content of 40 mass % or more and 60 mass % or less, wherein:

100 mass % of the total amount of moisture to be added during the producing the solid paste composition is mixed with other ingredients prior to feeding the paste dough composition into an extruder, or 100 mass % of the total amount of moisture to be added during the producing the solid paste composition is mixed with other ingredients in the extruder when an interior temperature of the extruder is less than 40° C.; and (ii) kneading the composition prepared in step (i) in the extruder at a temperature of from 110° C. to 190° C. with an SME of 700 kJ/kg or more under a pressure of 5.5 MPa or more;

(iii) cooling the composition kneaded in step (ii) to a temperature of less than 110° C.; and (iv) maintaining the composition for a continuous period of 0.02 hour or more from when the temperature fell below 90° C. until when the dry basis moisture content fell below 25 mass %, thereby forming the solid paste composition, wherein:

the kneading in step (ii) and/or the cooling in step (iii) are/is carried out using the extruder, wherein a ratio of a length of a flight screw part to a total length of a barrel of the extruder is 90% or less;

the solid paste composition comprises a starch content of in terms of dry mass basis 30 mass % or more and 60 mass % or less and a protein content of in terms of dry mass basis 10 mass % or more and 21 mass % or less; and the solid paste composition is pasta.

20. The process according to claim 10, the paste dough composition consists of the pulse-derived flour, water, and a seasoning, wherein the seasoning is selected from the group consisting of sugars, soy sauce, miso, sodium chloride, and combinations thereof.

21. The process according to claim 19, the paste dough composition consists of the pulse-derived flour, water, and a seasoning, wherein the seasoning is selected from the group consisting of sugars, soy sauce, miso, sodium chloride, and combinations thereof.

22. The process according to claim 19, the paste dough composition consists of the pulse-derived flour, water, and a food additive, wherein the food additive is selected from the group consisting of pH adjusters, minerals, artificial sweeteners, antioxidants, thickening stabilizers, emulsifiers, and combinations thereof.

* * * * *